United States Patent
Huber

(10) Patent No.: US 11,419,252 B2
(45) Date of Patent: Aug. 23, 2022

(54) PLOUGH DEVICE COMPRISING TWO CUTTING ELEMENTS

(71) Applicant: Huber Soil Solution GmbH, Wagna (AT)

(72) Inventor: Franz-Ferdinand Huber, Leibnitz (AT)

(73) Assignee: Huber Soil Solution GmbH, Wagna (AT)

( * ) Notice: Subject to any disclaimer, the term of this patent is extended or adjusted under 35 U.S.C. 154(b) by 105 days.

(21) Appl. No.: 16/483,798

(22) PCT Filed: Feb. 9, 2018

(86) PCT No.: PCT/EP2018/053313
§ 371 (c)(1),
(2) Date: Nov. 18, 2019

(87) PCT Pub. No.: WO2018/146263
PCT Pub. Date: Aug. 16, 2018

(65) Prior Publication Data
US 2020/0093051 A1     Mar. 26, 2020

(30) Foreign Application Priority Data
Feb. 10, 2017 (DE) ..................... 10 2017 102 683.5

(51) Int. Cl.
*A01B 9/00* (2006.01)
*A01B 13/12* (2006.01)
(Continued)

(52) U.S. Cl.
CPC ............... *A01B 13/12* (2013.01); *A01B 9/003* (2013.01); *A01B 15/08* (2013.01); *A01B 15/16* (2013.01); *A01B 17/00* (2013.01); *A01B 49/025* (2013.01)

(58) Field of Classification Search
CPC ........... A01B 9/00; A01B 9/003; A01B 9/006; A01B 13/08; A01B 13/12; A01B 15/08; A01B 15/16; A01B 17/00; A01B 49/025
See application file for complete search history.

(56) References Cited

U.S. PATENT DOCUMENTS

| 371,593 | A | * | 10/1887 | Kirk | ..................... | A01B 15/08 |
| | | | | | | 172/33 |
| 2,693,139 | A | * | 11/1954 | Focht | ..................... | A01B 15/08 |
| | | | | | | 172/33 |

(Continued)

FOREIGN PATENT DOCUMENTS

| AU | 1890683 A | 3/1985 |
| DE | 3541490 A1 | 5/1986 |

(Continued)

OTHER PUBLICATIONS

International Search Report for International Application No. PCT/EP2018/053313, dated May 29, 2019.

*Primary Examiner* — Gary S Hartmann
(74) *Attorney, Agent, or Firm* — Marshall, Gerstein & Borun LLP

(57) ABSTRACT

A plough device (100) and a method for ploughing a ground (120). A rotatable first plate-like cutting element (102) having a circumferential first cutting edge (103) is arranged on a support structure (101) and is designed such that when the support structure (101) is moved on the ground (120) along a ploughing direction (110), a side region (202) of a soil ridge (201) of the ground (120) can be cut by means of a first cutting region (104) of the first cutting edge (103). A second disc-shaped cutting element (105) having a second cutting edge (106) is arranged on the support structure (101) and is designed such that when the support structure (101) is moved on the ground (120) along a ploughing direction (110), a base region (203) of a soil ridge (201) of the ground (120) can be cut by means of a second cutting region (118) of the second cutting edge (106), wherein the second cutting element (105) is arranged relative to the first cutting element (102) in the ploughing direction (110) such that the second (Continued)

cutting region (118) is arranged before the first cutting region (104) in the ploughing direction.

24 Claims, 12 Drawing Sheets

(51) Int. Cl.
    *A01B 15/08*     (2006.01)
    *A01B 15/16*     (2006.01)
    *A01B 17/00*     (2006.01)
    *A01B 49/02*     (2006.01)

(56) References Cited

U.S. PATENT DOCUMENTS

| | | | | |
|---|---|---|---|---|
| 2,839,983 A | * | 6/1958 | Walsh | A01B 15/08 |
| | | | | 172/167 |
| 2,953,211 A | * | 9/1960 | Altgelt | A01B 15/08 |
| | | | | 172/736 |
| 2,980,191 A | * | 4/1961 | Sassmann | A01B 15/08 |
| | | | | 172/164 |
| 3,252,521 A | * | 5/1966 | Van Der Lely | A01B 17/00 |
| | | | | 172/71 |
| 3,714,990 A | * | 2/1973 | Tomik | A01B 9/00 |
| | | | | 172/58 |
| 2009/0101372 A1 | | 4/2009 | Matsumoto et al. | |
| 2018/0242513 A1 | * | 8/2018 | Bedosti | A01C 5/064 |

FOREIGN PATENT DOCUMENTS

| | | |
|---|---|---|
| DE | 3541438 A1 | 5/1987 |
| DE | 19902914 A1 | 1/2001 |
| DE | 202014105576 U1 | 12/2014 |
| EP | 0025623 A1 | 3/1981 |
| EP | 0162197 A2 | 11/1985 |
| GB | 1385951 A | 3/1975 |
| GB | 2063031 A | 6/1981 |
| SU | 745394 A1 | 7/1980 |

\* cited by examiner

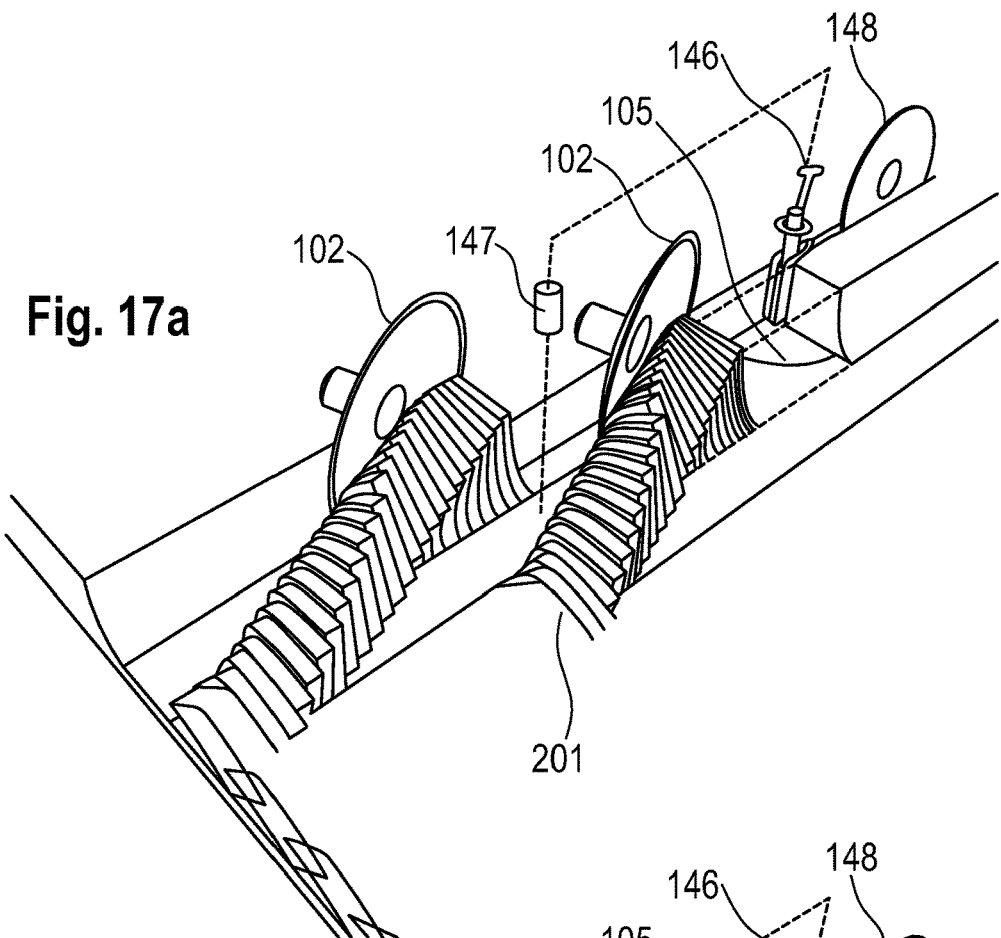
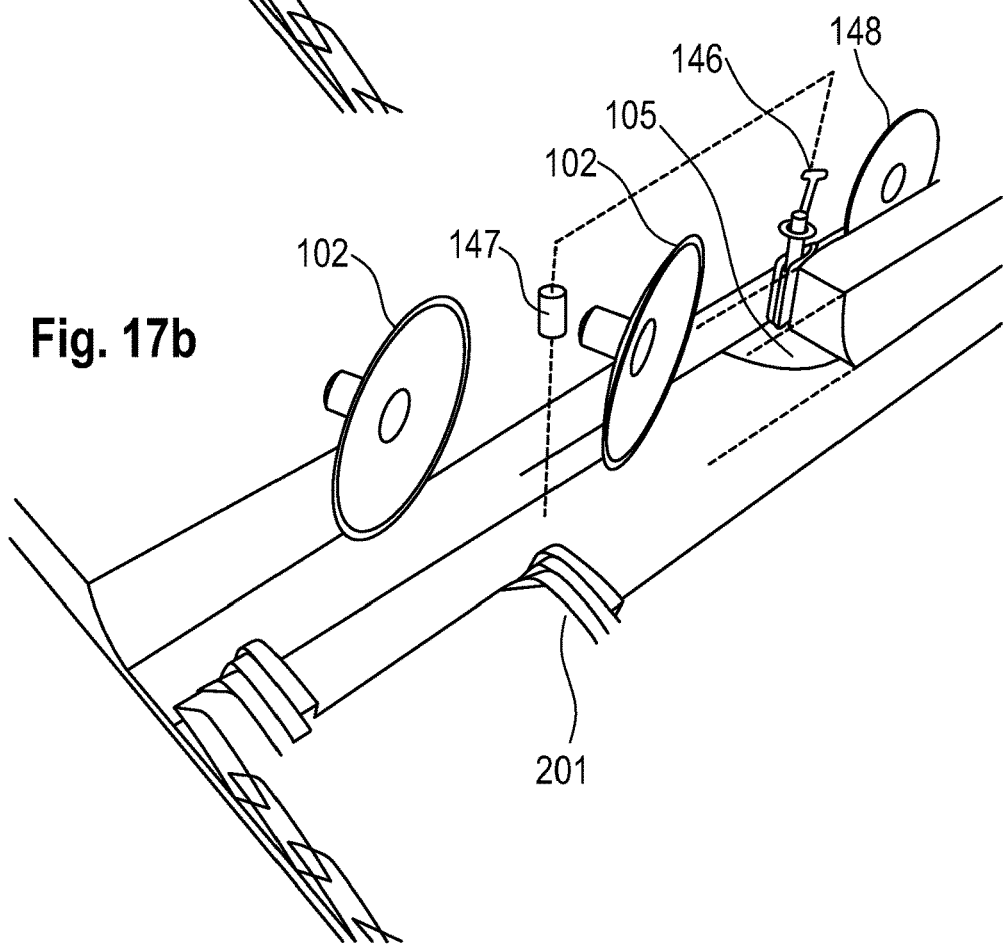

PLOUGH DEVICE COMPRISING TWO CUTTING ELEMENTS

CROSS-REFERENCE TO RELATED APPLICATION

This is the United States national phase of International Patent Application No. PCT/EP2018/053313 filed Feb. 9, 2018, which claims priority to DE 10 2017 102 683.5 filed Feb. 10, 2017, the entire contents of each of being which hereby incorporated by reference.

FIELD OF THE DISCLOSURE

The present invention relates to a plow device for plowing ground. The present invention furthermore relates to a method for plowing ground.

BACKGROUND

Plows are considered to be one of the most important ground tillage devices in agriculture, and are available in a wide range of variants. Plows comprise, for example, a plowshare which cuts what is referred to as an earth ridge from the field to be plowed or from the meadow, as well as a moldboard which is a usually curved, helical metal element that adjoins the plowshare and that turns the earth ridge.

The plowshare for example cuts an earth ridge out of the ground horizontally and vertically, using the moldboard. The plowshare subsequently transfers the earth ridge to the adjacent moldboard. Said moldboard receives the ridge, initially lifts it, owing to the curved shape of said moldboard, and subsequently deposits it to the side. The earth ridge is conventionally "scraped out" or "broken out" of the ground by means of the plowshare. That is to say that the plowshare and the lower moldboard edge of the moldboard scrape/break the earth ridge out of the earth by means of "rigid plow components," turn the earth ridge, and at the same time create the furrow base.

This subprocess requires a particularly significant tractive effort in the case of a moldboard plow.

The furrow width in the ground is, for example, approximately 35-50 cm, and the furrow depth is, for example, approximately 15 to 30 cm.

In the case of conventional plows comprising rigid plow bodies, the force required is substantially dependent on the high friction forces (soil reaction forces) which arise when pulling the plow. Furthermore, a high force is required for holding the plow in the plowing direction, since high lateral forces act on the plow as a result of the removal of the earth ridge.

A differing amount of force is required, depending on the ground conditions, i.e. the moisture content of the ground and the ground type (proportion of loam, clay and sand, and the like). Furthermore, when using conventional plows, the earth ridge is removed and turned in one piece, without being separated or loosened. This results in the earth ridges that have been removed from the ground and turned being present on the field in a compacted state.

DE 35 41 490 A1 describes a ground tillage machine which comprises a disc colter and a subsoiler. The disc colter forms a first cutting element, whereas the subsoiler is intended for loosening the subsoil, as a device following the disc colter. Said subsoil loosening device is not used for cutting a side region of an earth ridge of the ground in the plowing direction, but is instead arranged behind the disc colter. It is also not formed as a discoid cutting element. Owing to the disc colter that is arranged in front of the subsoiler, a furrow is cut by means of said disc colter, into which furrow the shafts of the subsoiler enter. In order that the subsoil can be loosened in a reliable manner, the subsoiler is designed as a driven element. When a ground tillage machine of this kind has to be pulled through the ground, the circumferential loosening devices of the subsoil loosening device result in a relatively high tractive force and a relatively high drive power requirement for the subsoil loosening device loosening device, which are disadvantageous because said high tractive forces can be applied only by more powerful machines, and, in addition, this results in relatively high fuel consumption. Irrespective thereof, the ground enrichment that is intended to be achieved using the subsoiler is in part compensated again in that heavy machines result in greater ground compaction on the field.

DE 35 41 438 A1 describes a plow body for ground tillage devices, in which a plowshare is arranged in front of an annular plate. Just one disc colter is provided, in the form of an annular plate, which disc colter further comprises a skimmer device at the output thereof, which skimmer device skims the earth provided in the annular plate for turning the earth ridge. Since the plow body that is arranged in front of the annular plate penetrates into uncut earth, this also requires a relatively high tractive force, which likewise involves the disadvantages described above.

DE 20 2014 105 576 U1 describes a ground tillage system which comprises a first ground tillage device comprising tines for lifting and deeply breaking up uncut ground, and which comprises a second ground tillage system that is arranged behind the first ground tillage device in the direction of travel and comprises a driven rotor, in order, for example, to incorporate plant remains into the ground broken up by the first ground tillage device; and a seed drill furthermore being provided in order to insert seeds into the ground, behind the rotor in the direction of travel. The plow device itself is thus the first ground tillage device which merely comprises a disc colter that is arranged in front of the actual conventional plow, in the plowing direction. An earth ridge cannot be created, lifted, or even turned using a plow device of this kind.

Finally, DE 199 02 914 A1 describes a ground tillage machine which likewise comprises plows arranged in front of one or more disc colters, only in a multiple arrangement. In the case of this known ground tillage machine, too, no earth ridge is cut from the base of a furrow in the plowing direction. Instead, an earth ridge of this kind is not created; the plow merely turns the ground in smaller, clod-like, amounts of earth. In any case, a double arrangement of two discoid or plate-shaped cutting elements that are matched to one another and interact in a defined manner is not described.

GENERAL DESCRIPTION

The object of the present invention is that of providing a plow device that requires less tractive effort and that furthermore leaves behind a seedbed that is virtually ready for seeding.

A substantial advantage of the invention is that the friction and shearing forces, i.e. the soil reaction forces, of the plow device moving through the ground can be minimized. A plow device is thus provided which ensures a lower tractive force requirement and, associated therewith, a significant fuel saving. In addition, further advantages consist in the fact that improved ecological agricultural ground tillage is possible, because the ground can be better loosened and aerated, and can thus be better supplied with oxygen in the sense of $CO_2$-exchange. In addition, damaging plow pan formation can be prevented, and the number of tillage operations until the seedbed is prepared can be reduced. The present invention proceeds from the fundamental consideration that, in the case of a conventional plow, the plowshare scrapes through the ground horizontally, as it were, and an earth ridge is cut out of the ground perpendicularly by means of a disc colter and a moldboard edge. Owing to the curvature of the plowshare, the earth ridge that forms the furrow is subsequently transferred to an adjacent moldboard which receives the ridge, winds it into a helical shape, and subsequently deposits it to the side, at a turn angle of approximately 130°. Owing to the relatively high friction forces, the tractive forces during plowing are also relatively high. The present invention begins to overcome these disadvantages of conventional plows comprising rigid plow bodies having rigid components in that novel, rotatable machine elements are used which perform the plowing itself. In principle, the rotating cutting elements have a positive effect on the tractive force requirement. According to the invention, this has been achieved in that just two cutting tools, which interact in a synergistic manner, represent the actual plow structure, the tractive force requirement when pulling the plow through the ground being significantly reduced, in comparison with rigid plow elements, simply by the fact that said cutting tools are rotating cutting elements.

According to a first aspect of the present invention, a plow device for plowing ground is described. The plow device comprises a support structure, a rotatable cutting element (e.g. a toothed disc), and a second cutting element (e.g. a further toothed disc that is angled relative to the first cutting element). The rotatable first cutting element comprises a circumferential first cutting edge, the first cutting element being arranged on the support structure and being designed such that a side region of an earth ridge of the ground (in particular of a furrow wall of the ground) can be cut by means of a first cutting region of the first cutting edge when the support structure is moved on the ground in a plowing direction (i.e. the tillage direction). The second cutting element comprises a second cutting edge, the second cutting element being arranged on the support structure and being designed such that a base region of an earth ridge of the ground (in particular along a separation plane between the earth ridge and the plow sole) can be cut by means of a second cutting region of the second cutting edge when the support structure is moved on the ground in the plowing direction. The second cutting element is arranged relative to the first cutting element, in the plowing direction, such that the second cutting region is arranged in front of the first cutting region, in the plowing direction.

The novel plow according to the invention thus comprises two discoid or plate-shaped cutting tools. In this case, one cutting tool is designed such that it divides the lateral edges of an earth ridge from the continuous ground by means of a cut, whereas the second cutting element separates the earth ridge from the continuous earth, at the plowing depth, in the region of the furrow base. The first cutting element that is intended for a substantially vertical cutting plane is preferably designed as an annular plate, specifically similarly to the disc colters, the annular plate comprising a circumferential cutting edge as the rotatable, substantially vertical cutting element. The circumferential cutting edge is preferably curved and thus vertically cuts out the earth ridge that has been horizontally pre-cut in the region of the furrow base and has been detached from the plowed-up topsoil in the furrow base region, and allows the cut-out earth ridge to pass through the concave hollow region of the annular plate and to slide back, in a turned form, from the annular plate and into the furrow. In this case, the annular plate comprises various depressions and elevations in the form of different radii, such as what are known as basket arches, i.e. inside planar surfaces followed by different radii or just one radius overall, which can be adapted accordingly, depending on the ground conditions. The geometry and the diameter of the annular plate have a significant influence on the result of the plowing process. The fact that the annular plate, i.e. a curved disc, is preferably toothed at the cutting edge results in improved engagement in the ground. The annular plate is preferably attached to the support structure by means of a plurality of adjustable machine elements in such a way that the work angle is variable. The cutting elements are preferably attached to the support structure so as to be exchangeable.

A moldboard designed as a share is preferably arranged after the two cutting elements in the plowing direction, and the cutting elements can preferably be rotated by the earth ridge itself, during plowing. Said cutting elements therefore do not have to be separately actively driven but can instead be rotated simply by pulling the novel plow through the earth. As a result, the tractive force requirement is significantly reduced compared with conventional plowshares that are rigidly attached to the plow device.

In an embodiment given by way of example, the first cutting element and/or the second cutting element is arranged on the support structure so as to be pivotable and/or so as to be displaceable in translation, in order to adjust the work angle. As a result, a work angle can be set according to the ground conditions and according to the desired tillage depth.

Furthermore, according to a further aspect, a method for plowing ground using the above-described plow device is provided.

While the plow device plows the ground, an aim is to achieve a desired furrow impression. What are known as earth ridges are cut out of the ground during plowing. An earth ridge comprises a side region along which the cutting element cuts. The earth ridge furthermore comprises a base region which connects the two side regions and is separated from the ground by means of the second cutting element, in the form of a plowshare. The ground accordingly comprises a separation plane (referred to as a furrow base) at the base region of the earth ridge. An approximately rectangular earth ridge is thus cut out of the ground, a horizontal cutting plane (=furrow base) resulting by means of the second cutting element, and a vertical cutting plane (=furrow wall) resulting by means of the first cutting element, on the remaining ground. Cutting out the earth ridge in a pincer-like manner forms a furrow wall in the ground, from which wall the side region of the earth ridge has been separated. Therefore, at the time of separation from the ground, the base region defines the horizontally lowest surface of the earth ridge.

The plowing direction or the tillage direction is defined as the direction in which the plow device is moved over the ground.

The support structure is designed to fasten at least the first and the second cutting element together. The support structure can be fastened to a traction unit, for example a tractor, in order to thus drive the cutting elements accordingly, in the plowing direction. The support structure can likewise be part of a bearer or a plow beam. The support structure comprises metal beams and/or fiber composite elements. Furthermore, as is described in detail below, the attached elements can also be fastened to the support structure so as to be adjustable.

The support structure thus forms a rigid fastening structure for the cutting elements. In other words, the cutting elements are fixed to the support structure such that no relative movement is possible between the cutting elements during plowing. Therefore, if, according to the invention, the second cutting element is pressed into the ground owing to the cutting of the earth ridge, the first cutting element is thus pressed into the ground at the same time, by means of a pull-down force.

The first cutting element is fastened to the support structure so as to be rotatable. Accordingly, the first cutting element forms a first axis of rotation, about which the first cutting element rotates. The first cutting element is in particular formed as a cutting plate and has a circular periphery. The circumferential first cutting edge is formed along the periphery. The side region of the earth ridge is separated from the furrow wall of the ground, and at the same time diverted to the side, by means of the first cutting edge. The circumferential first cutting edge comprises a first cutting region. The first cutting region is the peripheral portion of the first cutting edge that is the second, in the plowing direction, to come into contact with and cut the ground. The first cutting element may have a diameter of from approximately 500 mm to approximately 800 mm. Furthermore, the first cutting element may comprise a toothing (improved penetration depth) and may be centrally mounted and adjustable.

The first cutting element is rotated when the plow device moves along the ground. In this case, friction forces cause the first cutting element to be moved. In this case, the first cutting element is dimensioned such that, during plowing, in particular only the lower half of the first cutting element that is located below the first axis of rotation penetrates into the ground, such that friction forces with the ground bring about the rotation.

The rotation of the first cutting element furthermore causes the separated earth ridge to be lifted and at the same time to be diverted to the side. The separated earth ridge is in particular in frictional contact with a first cutting surface of the first cutting element. The first cutting surface is the surface of the first cutting element that is formed inside the first cutting edge. Furthermore, the first cutting surface is the surface which faces the separated earth ridge. The first cutting surface may be formed so as to be homogeneous, without recesses or elevations. Furthermore, the first cutting surface (i.e. the lateral surface of the first cutting element) may form a cone shape or a truncated cone shape. In a further embodiment, the first cutting surface of the rotating unit (cutting element) may be designed as a curved disc.

Owing to the lifting of the earth ridge by means of the rotating first cutting element, the earth ridge can be conducted to following elements, which are arranged behind the cutting element in the plowing direction, in an energy-efficient manner. For example, the moldboard that is described below may be arranged behind the cutting element in the plowing direction.

The second cutting element is for example rotatably fastened to the support structure, as a rotating disc or cutting blade having a cutting edge that extends in a translational manner. The base region of the earth ridge is separated from the furrow base of the ground, undercut, and optionally lifted at the same time, by means of the second cutting edge. The circumferential second cutting edge comprises a second cutting region. The second cutting region is the peripheral portion of the second cutting edge that is the first, in the plowing direction, to come into contact with and cut the ground.

According to an embodiment given by way of example, the first cutting region is formed within a first cutting plane, and the second cutting region is formed in a second cutting plane, the first cutting plane and the second cutting plane forming an angle relative to one another of in particular 30° to 135°, in particular 45° to 110°.

In this case, the first cutting edge extends in a first cutting plane, while the second cutting edge extends in a second cutting plane. In this case, the first cutting element and the second cutting element are fastened to the support structure relative to one another such that, in this case, the first cutting plane and the second cutting plane are not formed so as to be in parallel and are at an angle relative to one another of in particular more or less than 90° (opening angle). In other words, in a further embodiment given by way of example, the first cutting element can be arranged such that there is an angle of from approximately 0° to approximately ±30° between the axis of rotation of the first cutting element and an extension direction of the second cutting edge (or a tangent to the second cutting region if the second cutting element forms a rotating disc). In particular, the normal of the first cutting plane has a (directional) component that is in parallel with a horizontal direction when the plow device is resting as intended on the ground. The axis of rotation of the cutting element is in particular in parallel with the normal of the first cutting plane. Furthermore, the normal of the second cutting plane has a further (directional) component that is in parallel with a vertical direction when the plow device is resting as intended on the ground. An angle between the normals may be selected so as to be between 45° and 130° for example, in order to achieve a desired furrow impression in the ground.

When the first cutting plane and the second cutting plane are in particular at approximately 90° relative to one another, the second cutting element presses the undercut earth ridge towards the first cutting element. This results in it being possible for the earth ridge to be advantageously tilled between the first cutting element and the second cutting element during the movement in the plowing direction. A preferred plowing result or "crumbling" (comminution of clods) is provided by the interaction of the two rotating machine elements, i.e. the first and second cutting element. Moreover, the lateral traction of the first cutting element which has a negative effect on the tractor traction line is largely compensated by the counteraction of the second cutting element. The traction unit thus remains in the groove without significant countersteering.

The first cutting element (e.g. the curved disc) cuts the earth ridge at a first layer plane (tillage depth approximately 15-35 cm, proceeding from the ground surface), and transfers the earth ridge to an optional moldboard element (i.e. the guide plate). The moldboard element or the guide plate can also be designed as a rotatable conveying plate.

In the second layer plane (tillage depth approximately 15 to 30 cm, proceeding from the ground surface), the earth ridge is cut horizontally (i.e. from the furrow base) by the second cutting element.

The spacing of the two cutting planes (upper: rotating first vertical cutting element; lower: second horizontal cutting element) can be adapted by means of the possibility of adjusting the rotating cutting element.

The plow body, for example consisting of the main components of the cutting elements, guide plate and the moldboard, corresponds, for example, to an oblique twisted plane that is pulled through the ground. The earth ridge that is separated by means of the share and the perpendicular moldboard edge slides along the guide plate and on the moldboard, upwards and to the side, on the oblique twisted plane thereof. This process involves compression of the upper and extension of the lower half of the earth ridge. As a result, compressive, tensile and torsional stresses arise within the earth ridge, which stresses cause the ground to be broken up.

The arrangement according to the invention of the second cutting element in front of the first cutting element in the plowing direction makes it possible to reduce the friction force that leads to a high tractive force requirement of the plow device. Since the earth ridge is immediately undercut and separated from the furrow base by means of the second cutting element when cut by the first cutting element, the earth ridge is already lifted and turned by the first cutting element. The second cutting region is for example between 1 cm and 50 cm, in particular between 15 cm and 25 cm, in front of the first cutting region, in the plowing direction. The (in particular horizontal) second cutting disc (or cutting element) is the first to come into contact with the ground and runs in front, as it were, compared with the (in particular vertical) first cutting disc (or cutting element).

According to the present invention, the aim of largely replacing the conventional rigid plow body components with novel, rotatable machine elements is achieved. The rotating cutting elements according to the invention have an advantageous effect on the cutting and lifting operation and thus on the pulling lightness of a plow.

In order to make the horizontal earth ridge cut, in an embodiment given by way of example, described above, a discoid second cutting element that rolls along the furrow wall is used. Said second cutting element horizontally "undercuts" the furrow wall or the earth ridge that is to be plowed, and thus substantially facilitates the cleavage/furrow clearing.

Furthermore, in an embodiment given by way of example, described above, a rotatable vertical first cutting element (curved disc) is used and is combined with the above-described rotatable, horizontal second cutting element.

The vertical curved first cutting element then vertically cuts the earth ridge that has previously already been carved horizontally by the upstream second cutting element, and at the same time turns said ridge by means of the rotational movement of the annular plate.

This concept provides a light-pulling, fuel-efficient plow that simultaneously creates a constant furrow impression that is virtually ready to use as a seedbed.

According to an embodiment given by way of example, the first and/or the second cutting element is/are pivotably fastened to the support structure, for example by means of a joint, such that the angle between the axis of rotation and the extension direction of the second cutting edge can be adjusted and fixed in a desired position.

The first cutting element is preferably formed in the manner of a hollow plate, having a curvature of the inner surface thereof, such that, during plowing, the earth ridge that is separated laterally from the unplowed ground by means of the first cutting tool is guided into the cavity of the hollow plate and is twisted by the curvature of the inner surface and, after emerging from the hollow plate, can be replaced on the ground of the furrow as a turned earth ridge. When the hollow plate is dimensioned accordingly, it is possible for the earth ridge to be turned not partially, but instead completely about 180°. This is also possible even without a plowshare or, in addition, a moldboard or guide plate, being required.

According to a further embodiment, the second cutting element is provided with an angle adjustment means with respect to the work angle $\alpha$ thereof, using which means it is possible to set a work angle $\alpha$ that is positive in the plowing direction. This means that the plate-like cutting element that is designed as a disc and is arranged so as to be substantially horizontal, which cutting element severs the unplowed ground in the region of the furrow base, can be set at a positive angle $\alpha$ in the plowing direction, such that, as a result, in conjunction with self-adjustment of the second cutting element, the depth thereof in the ground, at which depth the furrow base is cut from the unplowed ground, is substantially automatically maintained during plowing. The angle adjustment means with respect to the work angle of the second discoid cutting element can preferably be adjusted mechanically or hydraulically or electrically. In this case, the work angle is dependent on the plowing speed, the ground conditions, the moisture content of the ground, and other factors.

In addition, a spring is preferably provided, which spring ensures a required pull-down force when moving the second cutting element along the furrow base and is of such a size or spring force that the second cutting element is oriented so as to be substantially horizontal, owing to the weight of the earth ridge. In this case, the spring is dimensioned such that, depending on the depth that is set, a specific weight of the earth ridge ensures that the second cutting element is pressed into a substantially horizontal direction, but that, in the event of a reduced weight of the earth ridge, the work angle increases and optionally, as a result, in the event of further tractive force being applied to the plow according to the invention, the second cutting means that cuts substantially horizontally in the region of the furrow base emerges from the ground that is to be plowed. The cutting of the horizontal section in the region of the furrow base by means of the second cutting element is also referred to as undercutting. In this case, the circumferential cutting edge of the cutting element rolls along the furrow base and separates the earth ridge, in the furrow base region, from the unplowed ground. The combination of the adjusted work angle in conjunction with the spring force can be combined, within the meaning of a mechanical or a hydraulic adjustment, as a regulation of the pull-down depth, and thus fulfils two essential functions: Firstly, horizontal separation of the earth ridge from the unplowed ground is achieved. Secondly, the pull-down force is generated or regulated, and the plow is guided. Precisely the adjustment of the cutting plate in the traction direction, which adjustment is variable according to the prevailing conditions, makes it possible to simultaneously control the pull-down force of the plow. The essential advantage of the plow according to the invention is that of using the novel device to save power and to till the farmland or the meadow in a manner that is advantageous in terms of ecology, physical aspects of the ground, and plant cultivation.

According to a development of the invention, the second cutting element is provided with an internal bearing, arranged in a tube, in the manner of a drum bearing. Arranging the bearing of the second cutting element in a drum or in a tube protects against dirt entering the bearing and thus ensures reliable functioning of the second cutting element and furthermore reduces the resistance when pulling the plow device through the ground that is to be plowed.

The second cutting element is preferably designed as a spoked wheel or comprises a tapering cutting edge having an undercut in the spoke region. Designing the second cutting element as a spoked wheel is advantageous compared with a wheel provided from solid material, in that the novel plow can be produced in a more cost-effective manner as it requires less material. A further advantage is that caking or adhesion of earth cannot occur anywhere that there are empty spaces between the spokes.

In order for it to be possible to ensure a long service life of the plow according to the invention, it is furthermore preferable for the second cutting element to consist of a composite material, in particular the side of the second cutting element that faces the furrow base and the cutting edge consisting of steel, and the upper face that faces the earth ridge comprising a wear-resistant and adhesion-reducing plastics material. As a result, the second cutting tool can be made lighter, and thus ultimately the tensile force required for plowing can also be reduced. It is furthermore advantageous for adhesion-reducing plastics material to be used, since in this case parts of the earth ridge can no longer continue to adhere, or can continue to adhere only insignificantly, to the second cutting element.

According to a further embodiment, the second cutting element is formed in two parts and comprises a rotating cutting ring which is supported with respect to a stationary inner wheel by means of a bearing. This means that a support member in the form of a wheel is rigidly connected to the support of the plow according to the invention, and only the cutting edge, in the form of an outer rim, continues to rotate about the stationary part of the plate-like second cutting element. More preferably, the cutting edge is actively driven. Above all, if the second cutting element is a curved disc, the forces that act on the cutting elements during plowing are sufficiently great for the rotating cutting edge to rotate the disc simply on account of the tractive force being applied to the plow by the ground, without being actively driven.

A device such as the joint described above is used for adjusting the cutting element angle (plate disc angle) and allows for adjustment of the cutting element inclination angle (vertical inclination with respect to the furrow wall of the ground) and of the cutting element direction angle (to the plowing direction, i.e. to the direction of travel of the tractor). The height of the cutting line of the cutting element, between the first cutting edge and the furrow wall, can be adjusted, as described above, using an adjustable strut. Accordingly, the vertical spacing between the first cutting element and the second cutting element can be adjusted in a variable manner. In other words, in a further embodiment given by way of example, the first cutting element and the second cutting element can be arranged relative to one another such that the cutting region of the first cutting edge of the first cutting element is spaced apart vertically from the second cutting edge of the second cutting element.

According to a further embodiment given by way of example, the second cutting element is a rotatable cutting element, and the second cutting edge is a cutting edge around the circumference of the second cutting element. In this case, the second cutting element can be driven or rotated by a drive means. Alternatively, the second cutting element may be a cutting blade.

According to a further embodiment given by way of example, the first and/or second cutting element is in the shape of a cone or in the shape of a truncated cone. For example, the first and/or second cutting element comprises a fastening region on the axis of rotation thereof, which fastening region is formed in a fastening plane. The circumferential first cutting edge extends within a first or second cutting plane, the fastening plane being spaced apart from the first or second cutting plane, along the corresponding axis of rotation. The cutting surface of the first or second cutting element is formed between the circumferential first or second cutting edge and the fastening region.

According to a further embodiment given by way of example, the first or second cutting edge of the first or second cutting element is designed so as to be curved and toothed (and for example in the form of a concave disc). A curved design means that depressions or elevations (toothing) are formed in the first or second cutting edge. As a result, it is possible to achieve an improved cutting action of the first or second cutting element when separating the earth ridge. As a result of the cone-shaped design, in particular of the first cutting element, the earth ridge sliding along said element can be subjected to turning, and therefore it may not be necessary to attach a moldboard or guide plate.

According to a further embodiment given by way of example, the plow device comprises a moldboard which is arranged on the support structure so as to be behind the first cutting region of the first cutting element, in the plowing direction. The moldboard comprises a conveying surface, along which the earth ridge can be conveyed after being separated from the ground. The moldboard may be identical to the guide plate and may be formed integrally therewith. The conveying surface is domed or helical, such that the earth ridge can be turned when the earth ridge sweeps along the conveying surface.

Owing to the rotation of the first cutting element, the separated earth ridge is slightly lifted and is deposited on the conveying surface of the moldboard. When the plow device moves in the plowing direction, the earth ridges are displaced along the moldboard, and accordingly counter to the plowing direction. The moldboard is twisted in a curved, helical manner, the screw axis for example having a component that is in parallel with the plowing direction. This achieves the function of the separated earth ridges being turned. In other words, the moldboard receives the earth ridge, initially lifts it, owing to the curved shape of said moldboard, and subsequently deposits it to the side. This process is also referred to as "turning." The turning angle is approximately 130 degrees. The moldboard may be integral with and formed in one piece with the guide plate.

According to a further embodiment given by way of example, the moldboard comprises a receiving region for receiving the first cutting element, the first cutting element being received in the moldboard such that the first cutting region of the first cutting edge protrudes from the moldboard in the plowing direction. For example, the first cutting element can be arranged relative to the moldboard such that a region of the first cutting element overlaps with the moldboard, in particular overlaps when viewed in the direction of the axis of rotation of the first cutting element, only the first cutting region protruding from the moldboard in the direction of the plowing direction.

The receiving region of the moldboard can furthermore comprise a depression which is adapted to the dimensions or to the profile of the first cutting element. In particular, the receiving region of the moldboard may comprise a recess, the recess having an arcuate course which is formed so as to correspond to the peripheral course of the circumferential first cutting edge of the first cutting element.

According to a further embodiment given by way of example, the support structure is designed such that the first cutting element and/or the second cutting element can be adjusted relative to the moldboard, in the plowing direction. For example, the first cutting element and the second cutting element can be displaceably fastened to the support structure by means of bolted connections which can engage in slots of the support structure. Adjusting the spacings of the first cutting element, the second cutting element and the support structure in the plowing direction makes it possible for the plow device to be adjusted to specific conditions of different ground types and to be optimized for efficiency.

According to a further embodiment given by way of example, the support structure is designed such that the first cutting element can be adjusted relative to the moldboard, along a directional component of the axis of rotation. As a result, for example, a spacing between the first cutting element and the moldboard can be readjusted or adjusted to desired ground conditions.

According to a further embodiment given by way of example, the support structure is designed such that a spacing between the first cutting region of the first cutting edge of the first cutting element and the second cutting edge of the second cutting element can be adjusted.

The plow device thus allows for a light-pulling pre-plowing effect. The coefficient of friction is thus significantly reduced compared with conventional rigid plow bodies.

The described plow device allows for a reduction in tractive force/fuel owing to the pulling lightness of the plow device. Furthermore, the plow device can be used universally and is operable in almost all ground conditions. Furthermore, the rotational movement of the cutting plate causes the earth ridges to be continuously broken. This achieves the desired crumbling of the clod (clod comminution). The clod comminution effect makes it possible for post-tillage processes to be reduced (saves on work steps up to seedbed tillage). Furthermore, the ground is advantageously mixed thoroughly. Moreover, conventional standard components or standard additional tools such as fertilizer spreaders and disc colters are no longer required. The rotating first and/or second cutting element means that there is less wear and thus lower costs for replacement parts.

According to a further embodiment given by way of example, the plow device comprises a further rotatable first cutting element having a circumferential further first cutting edge, the further first cutting element being arranged on the support structure beside the first cutting element so as to be spaced apart in a direction orthogonal to the plowing direction, and being designed such that, when the support structure is moved on the ground in the plowing direction, a further side region of a further earth ridge can be cut from the ground by means of a further first cutting region of the further first cutting edge and the further first cutting element can be rotated, such that the further earth ridge can be lifted by means of the further first cutting element.

The embodiment described above makes it clear that a plurality of first cutting elements can be arranged so as to be spaced apart and beside one another, side-by-side in the plowing direction, i.e. in a direction orthogonal (in a horizontal plane) to the plowing direction. As a result, a plurality of earth ridges that are arranged side-by-side in the plowing direction can be cut from the ground, lifted, and optionally turned, by means of the first cutting elements. In a preferred embodiment, corresponding further second cutting elements can also be arranged in front of the corresponding further first cutting elements.

In an embodiment given by way of example, the first cutting element and the second cutting element are arranged on the support structure so as to be exchangeable (e.g. by means of screw connections). For example, the second cutting element can be fitted subsequently to a support structure (for example a plowshare), as a horizontal cutting disc.

According to a second aspect of the invention, a method for plowing ground is proposed, said method comprising the following method steps: A support structure is moved on the ground in a plowing direction to be performed, which movement is followed by cutting of a side region of an earth ridge of the ground, for which purpose a first cutting region of a first cutting edge of a first cutting element is provided, which is arranged on the support structure. Furthermore, a base region of an earth ridge of the ground is cut by means of a second cutting region of a second cutting edge of a second cutting element, which is likewise arranged on the support structure. The second cutting region of the second cutting element is in front of the first cutting region of the first cutting element in the plowing direction.

A work angle $\alpha$ of the second cutting element, defined in the plowing direction, is preferably adjusted mechanically or hydraulically or electrically. It is thus possible to vary the tractive force conditions and plowing results, taking account of different ground qualities and usage conditions.

It is noted that, in order to simplify understanding, the terms "horizontal" and "vertical" and "upper" and "lower" relate to arrangements and embodiments of the plow devices, the plow device being considered to be resting as intended on the ground and movable in the tillage direction during plowing operation.

It is noted that the embodiments described here represent only a limited selection of possible variants of the invention. It is thus possible to combine the features of individual embodiments in a suitable manner, and therefore the explicit variants here are considered to disclose, in an obvious manner, a plurality of different embodiments for a person skilled in the art. In particular, some embodiments of the invention are described by way of device claims, and other embodiments of the invention are described by way of method claims. However, upon reading this application it will immediately become clear to a person skilled in the art that, unless explicitly stated otherwise, in addition to a combination of features belonging to one type of subject matter of the invention, it is also possible to combine, as desired, features belonging to different types of subject matter of the invention.

BRIEF DESCRIPTION OF THE FIGURES

In order to further explain and for the purpose of a better understanding of the present invention, embodiments will be explained in greater detail in the following, with reference to the accompanying drawings. In the drawings:

FIG. 2b is a schematic view of the plow device of FIG. 2a;

FIG. 5b is a schematic view of the double plow device of FIG. 5a;

FIG. 15b shows the vertical annular plate of FIG. 15a;

FIG. 17a shows an embodiment comprising a driven second cutting element for two following first cutting elements; and FIG. 17b shows the driven second cutting element of FIG. 17a.

DETAILED DESCRIPTION OF EMBODIMENTS GIVEN BY WAY OF EXAMPLE

The same or similar components in different figures are provided with the same reference signs. The drawings in the figures are schematic.

Figure 1:
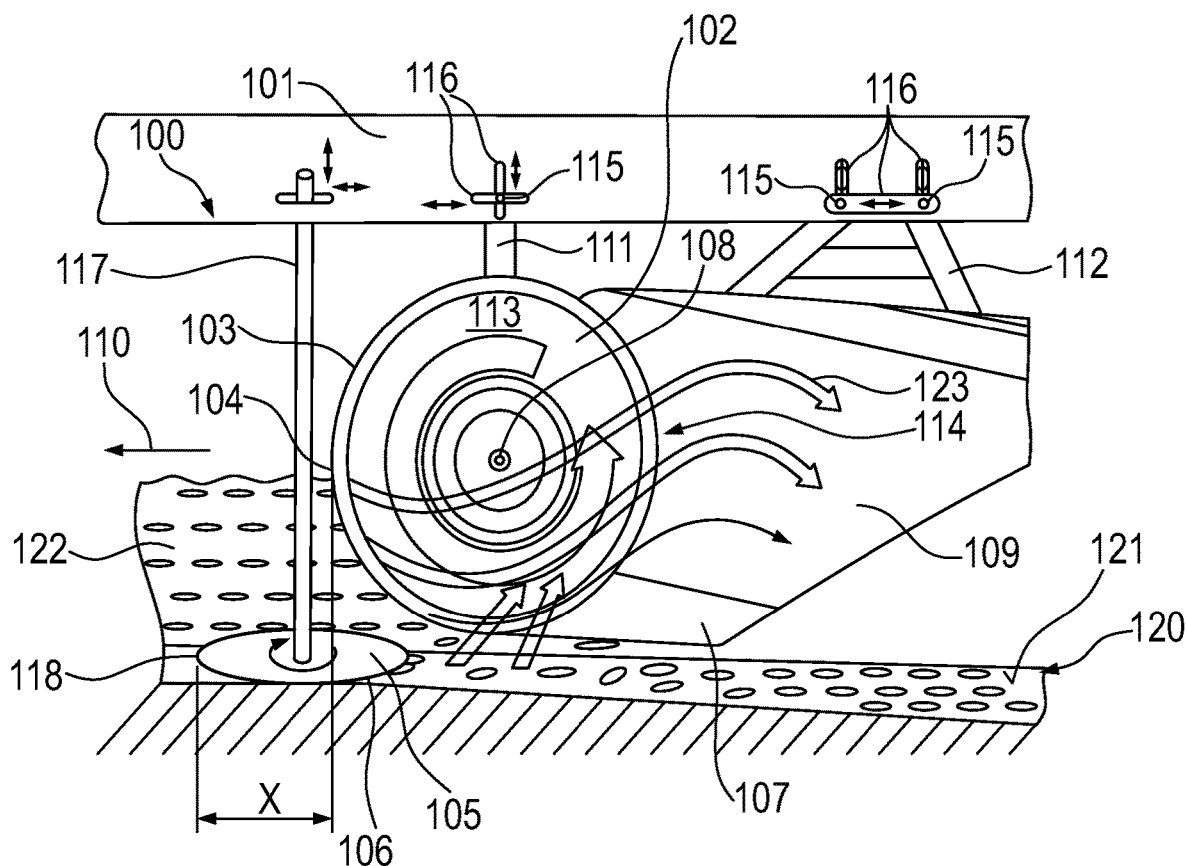
FIG. 1 is a schematic view of a plow device according to an embodiment, given by way of example, of the present invention.

FIG. 1 shows a plow device 100 for plowing ground 120. A rotatable first cutting element 102 comprising a circumferential first cutting edge 103 is arranged on a support structure 101 and is designed such that a side region 202 of an earth ridge 201 of the ground 120 can be cut by means of a first cutting region 104 of the first cutting edge 103 when the support structure 101 is moved on the ground 120 in a plowing direction 110. A second cutting element 105 comprising a second cutting edge 106 is arranged on the support structure 101 and is designed such that a base region 203 of an earth ridge 201 of the ground 120 can be cut by means of a second cutting region 118 of the second cutting edge 106 when the support structure 101 is moved on the ground 120 in a plowing direction 110, the second cutting element 105 being arranged relative to the first cutting element 102, in the plowing direction 110, such that the second cutting region 118 is arranged in front of the first cutting region 104 in the plowing direction. The second cutting region 118 is thus spaced apart from the first cutting region by the spacing x.

Since the support structure 101 is pressed towards the separation plane 121 of the ground 120, the cutting element 102 is accordingly also pressed towards the separation plane 121, such that the cutting element 102 is retained at the desired ground depth during plowing.

Figure 2A:
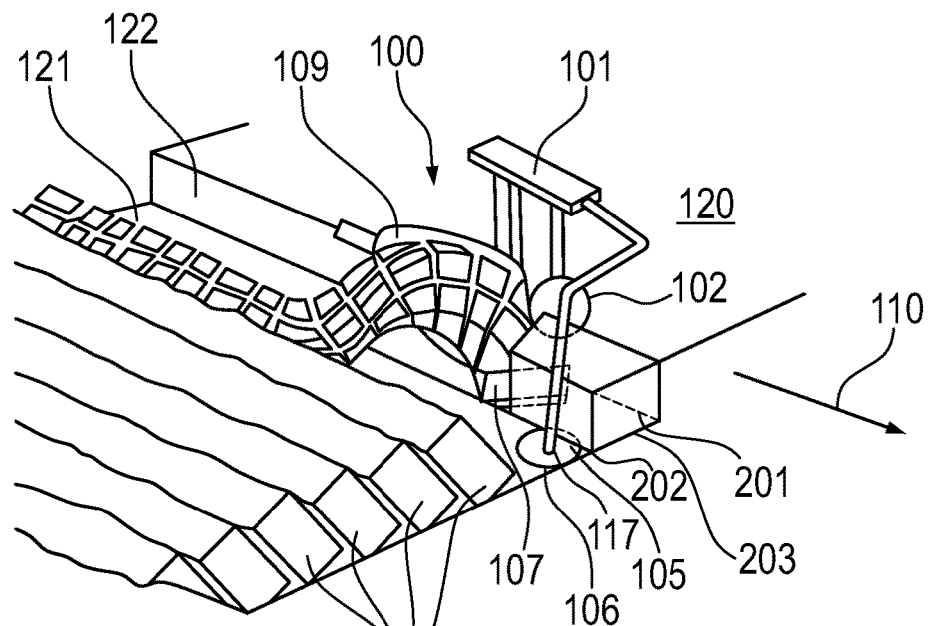
FIG. 2a is a schematic view of a plow device according to an embodiment, given by way of example, of the present invention during a plowing process.
Figure 2B:
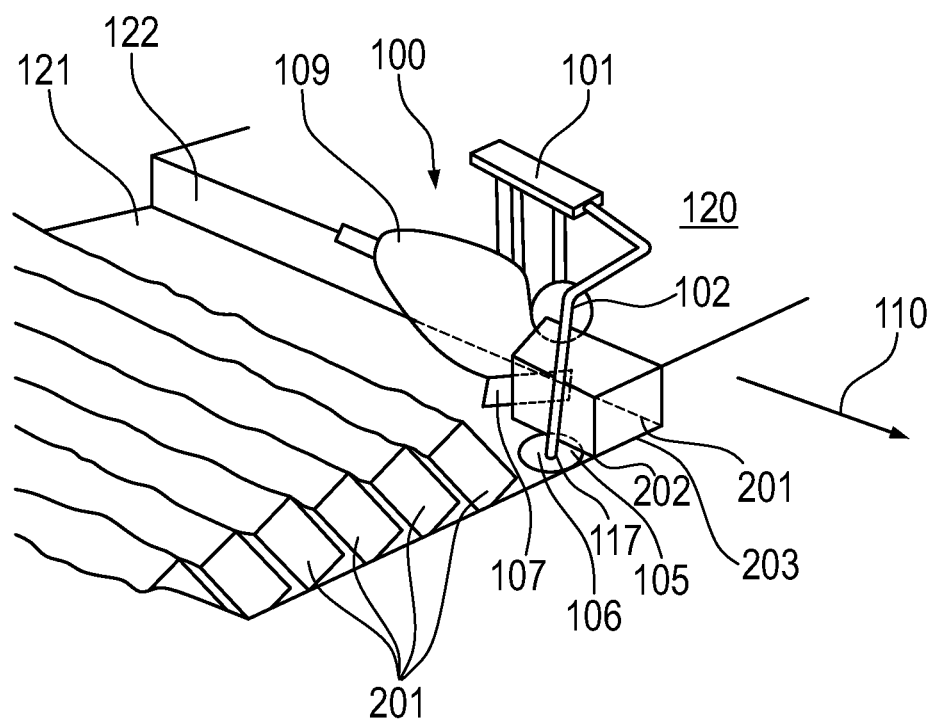

As shown in FIGS. 2a and 2b, what are known as earth ridges 201 are cut out of the ground 120 during plowing. An earth ridge 201 comprises a side region 202 along which the cutting element 102 cuts. The earth ridge 201 furthermore comprises a base region 203 which connects the two side regions 202 and is separated from the ground 201 by means of the second cutting element 105. The ground 120 accordingly comprises a separation plane 121 (referred to as a furrow base 121) at the base region 203 of the earth ridge. After the earth ridge 201 has been cut out, the furrow wall 122 is formed in the ground 121, from which wall the side region 202 of the earth ridge 201 has been released. Therefore, at the time of separation from the ground 120, the base region 203 defines the vertically lowest surface of the earth ridge 201. At the time of separation from the ground 120, the side regions 202 of the earth ridge 201 define the lateral wall regions of the earth ridge 201.

The plowing direction 110 is defined as the direction in which the plow device 100 is moved over the ground 120.

As shown in FIG. 1, the support structure 101 is designed to fasten at least the first cutting element 102 and the second cutting element 105 together. Furthermore, the moldboard 109 can be fastened to the support structure 101. The support structure 101 can be fastened to a traction unit, for example a tractor, in order to thus drive the cutting elements 102, 105 accordingly, in the plowing direction 110. The support structure 101 comprises, for example, first and second support elements 111, 112.

The support structure 101 thus forms a rigid fastening structure, in particular for the cutting elements 102, 105. The cutting elements 102, 105 are fixed to the support structure such that no relative movement is possible between the positions of the cutting elements 102, 105 during plowing. Therefore, if, according to the invention, the second cutting element 105 is pressed towards the ground 120 owing to the cutting of the earth ridge 201, the first cutting element 102 is thus pressed into the ground 120 at the same time.

The first cutting element 102 and the second cutting element 105 are rotatably fastened to the support structure 101. Accordingly, the first cutting element 102 forms an axis of rotation 108, about which the cutting element 102 rotates. The second cutting element 105 forms a second axis of rotation 117, about which the second cutting element 105 rotates. The first cutting element 102 and the second cutting element 105 are in particular formed as cutting plates and have a circular periphery. The corresponding circumferential first cutting edge 103 and second cutting edge 106 are formed along the periphery. The side region 202 of the earth ridge 201 is separated from the furrow wall 122 of the ground by means of the first cutting edge 103. The circumferential first cutting edge 103 comprises a first cutting region 104. The cutting region 104 is the peripheral portion of the first cutting edge 103, which is the first, in the plowing direction 110, to come into contact with and cut the ground 120. A base region 203 of the earth ridge 201 is separated from the ground 120 by means of the second cutting edge 106. The second cutting region 118 of the second cutting edge 106 is the peripheral portion of the second cutting element 105, which is the first, in the plowing direction 110, to come into contact with and cut the ground 120.

The cutting element 102 is rotated when the plow device 100 moves along the ground 120. In this case, friction forces, for example, cause the cutting element 102 to be moved. In this case, the cutting element 102 is dimensioned such that, during plowing, in particular only the lower half of the cutting element 102 that is located below the axis of rotation 108 penetrates into the ground 120, such that friction forces with the ground 120 bring about the rotation.

The rotation of the first cutting element 102 furthermore causes the separated earth ridge 201 to be lifted. This is shown in FIG. 1 by the arrows which indicate the conveying direction 123 of the earth ridge 201 along the plow device 100.

The separated earth ridge 201 is in particular in frictional contact with a cutting surface 113 of the cutting element 102. The cutting surface 113 is the surface of the cutting element 102 that is formed inside the first cutting edge 103 or is surrounded thereby. Furthermore, the cutting surface 113 is the surface which faces the separated earth ridge 201. The cutting surface 113 may, as shown in FIG. 1, be formed so as to be homogeneous, without recesses or elevations.

Owing to the lifting of the earth ridge 201 by means of the rotating cutting element 102 (see conveying direction 123 of the earth ridge 201), the earth ridge 201 can be conveyed to the following moldboard 109 in an energy-efficient manner.

In particular, in this case the first cutting element 102 and the second cutting element 105 are fastened to the support structure 101, relative to one another, such that the cutting region 104 of the cutting element 102 is spaced apart from the second cutting element 105 in the vertical direction, or is located above the second cutting element 105, when the plow device 100 is resting as intended on the ground 120.

The rotating cutting element 102 and the second cutting element 105 interact in a synergistic manner. Firstly, the second cutting element 105 keeps a desired plowing depth constant because the cut earth ridge 201 presses against the second cutting element 105 or the guide plate 107 at a compression force/pull-down force FP, and thus acts counter to an uplift of the rotating cutting element 102. At the same time, use is made of the energetically advantageous effect of the rotating cutting element 102 when cutting the earth ridge 201, in particular the side surfaces or side regions 202 of the earth ridge 201. As a result, an energy-efficient plow device 100 is provided, which furthermore has advantages with respect to the physical aspects of the ground, such as improved crumbling. Furthermore, the rotating second cutting element 105 causes the cut earth ridge 201 to be pressed towards the first cutting element 102, such that crumbling of the cut earth ridge 201 can take place. Moreover, owing to a lateral force which is introduced into the support structure 101 by means of the upstream second cutting element 105, a lateral force induced on the first cutting element 102 during cutting is counteracted, such that simpler and improved guidance of the plow device 100 using a traction unit is possible.

The first cutting element 102 and the second cutting element 105 are arranged relative to one another on the support structure 101 such that the second cutting region 118 of the second cutting edge 106 of the second cutting element 105 is located at a spacing x in front of the first cutting region 104 of the first cutting edge 103 of the first cutting element 102, in the plowing direction 110. As a result, during plowing the rotating second cutting element 105 encounters the earth ridge 201 first and cuts said earth ridge from the remaining ground 120 in an energy-efficient manner, by means of the second cutting edge 106. Subsequently, the first cutting edge 103 of the first cutting element 102 cuts an edge region 202 of an earth ridge 201. The earth ridge 201 subsequently encounters the guide plate 107. As a result, the first cutting element 102 and the second cutting element 105 cut the earth ridge 201 in an energy-efficient manner and are at the same time kept at the desired cutting depth by means of the compression force pressing on the guide plate 107.

A region (approximately half of a circular disc) of the second cutting element 105 undercuts the earth ridge 201. A further fastening region of the second cutting element 105, on which a fastening rod/shaft (axis of rotation 117) for fastening to the support structure 101 is arranged, is formed on the second cutting element, on the side remote from the first cutting element. As a result, during plowing the fastening rod/shaft proceeds in an already tilled furrow, reducing the tractive force of the plow device 100.

The plow device 100 comprises a moldboard 109 which is arranged on the support structure 101 so as to be behind the first cutting region 104 of the first cutting element 102, in the plowing direction 110. The moldboard 109 comprises a conveying surface, along which the earth ridge 201 can be conveyed after being separated from the ground 120. The conveying surface is domed, such that the earth ridge 201 is turned when the earth ridge 201 sweeps along the conveying surface.

Owing to the rotation of the first cutting element 102, the separated earth ridge 201 is slightly lifted and is deposited on the conveying surface of the moldboard 109. When the plow device 100 moves in the plowing direction 110, the earth ridges 201 are displaced along the moldboard 109, and accordingly counter to the plowing direction 110. The moldboard 109 is twisted in a curved, helical manner, the screw axis for example having a component that is in parallel with the plowing direction 110. This achieves the function of the separated earth ridges 201 being turned. In other words, the moldboard 109 receives the earth ridge, initially lifts it, owing to the curved shape of said moldboard, and subsequently deposits it to the side. This process is also referred to as "turning." The turning angle is approximately 130 degrees.

The moldboard 109 comprises a receiving region 302 (see FIG. 3) or a recess 114 for receiving the cutting element 102, the cutting element 102 being received in the moldboard 109 such that the first cutting region 104 of the first cutting edge 103 protrudes from the moldboard 109 in the plowing direction 110. The recess 114 has an arcuate course which is formed so as to correspond to the peripheral course of the circumferential first cutting edge 104 of the first cutting element 102.

The support structure 100 is designed such that the first cutting element 102, the moldboard 109 and/or the second cutting element 105 can be adjusted, relative to one another, in the plowing direction 110 and/or perpendicularly, vertically to the plowing direction 110. For example, the first cutting element 102 and the moldboard 109 can be displaceably fastened to the support structure 101 by means of bolted connections 115 which can engage in slots 116 of the support structure 101. Adjusting the spacings of the first cutting element 102, the second cutting element 105, the moldboard 109 and the support structure 101 in the plowing direction 110 makes it possible for the plow device 100 to be adjusted to specific conditions of different ground types and to be optimized for efficiency. Furthermore, the elements can be readjusted if the elements warp following use of the plow device 100.

Furthermore, the support structure 101 can be designed such that it is possible to adjust, relative to one another, the first cutting element 102 along a directional component of the first axis of rotation 108, and the second cutting element 105 along a directional component of the second axis of rotation 117. In particular, it is possible to adjust an angle between the first axis of rotation 108 and the second axis of rotation 117. The first cutting edge 103 extends in a first cutting plane, while the second cutting edge 106 extends in a second cutting plane. In this case, the first cutting element 102 and the second cutting element are fastened to the support structure 100, relative to one another, such that, in this case, the first cutting plane and the second cutting plane are not formed so as to be in parallel and are at an angle relative to one another.

For example, an angle between the first axis of rotation 108 and the second axis of rotation 117 is less than 90°, in particular between 45° and 80°.

Accordingly, the flexible attachment of the cutting element 102, the moldboard 109 and/or the second cutting element 105 to the support structure 101 makes it possible for a spacing between the cutting region 104 of the first cutting edge 103 of the cutting element 102 and the second cutting edge 106 of the second cutting element 105 to be adjusted.

Figure 3:
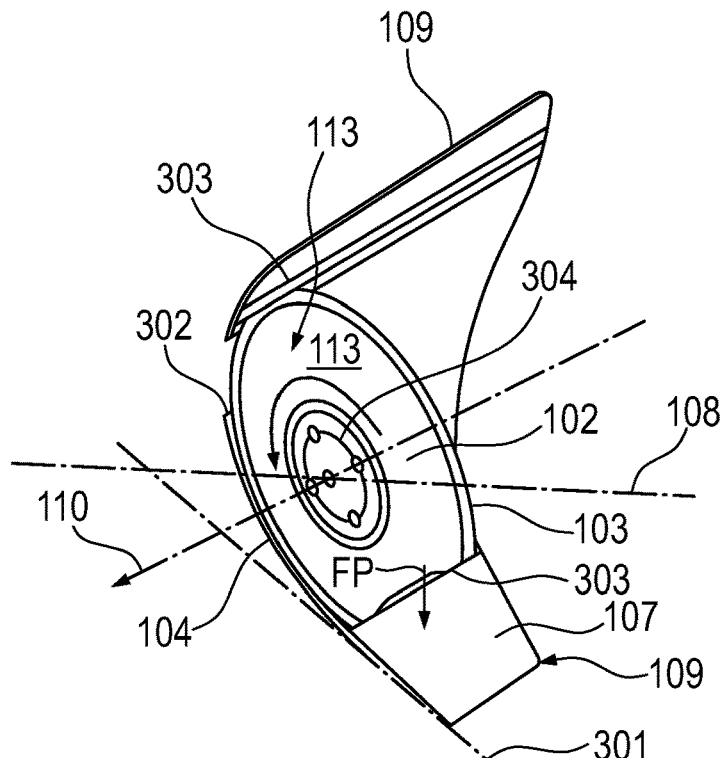
FIG. 3 is a schematic view of a plow device according to a further embodiment, given by way of example, of the present invention, in which a cutting element is arranged on a moldboard in an overlapping manner.

FIG. 3 is a schematic view of a plow device 100 according to a further embodiment, given by way of example, of the present invention, in which the cutting element 102 is arranged on the moldboard 109 in an overlapping manner.

The first cutting element 102 and/or the second cutting element 105 may be pivotably fastened to the support structure 101, for example by means of a joint, such that an angle between the first axis of rotation 108 and the second axis of rotation 117 can be adjusted and fixed in a desired position.

The guide plate 107 is located in a guide plane. The normal of the guide plane has a (directional) component that is oriented vertically when the plow device 100 is resting as intended on the ground. As a result, owing to the gravitational force thereof, an earth ridge 201 conveyed on the guide plate 107 exerts a compression force FP towards the ground 120. Said compression force FP pushes the support structure 101, and accordingly the cutting element 102, towards the ground 120. The guide plane may for example be in parallel with the second cutting plane.

The first cutting element 102 in FIG. 3 is in the shape of a truncated cone. The first cutting element 102 comprises a fastening region 304 on the axis of rotation 108 thereof, which fastening region is formed in a fastening plane. The circumferential first cutting edge 103 extends within the first cutting plane, the fastening plane being spaced apart from the cutting plane, along the axis of rotation 108. The cutting surface 113 of the cutting element 102 is formed between the circumferential first cutting edge 103 and the fastening region 304.

In FIG. 3, the cutting element 102 is arranged relative to the moldboard 109 such that a region of the cutting element 102 overlaps with the moldboard 109, in particular overlaps when viewed in the direction of the first axis of rotation 108 of the first cutting element 102, only the first cutting region 104 protruding from the moldboard 109 in the direction of the plowing direction 110.

The receiving region 302 of the moldboard 109 is formed for example by a depression which is adapted to the dimensions or to the profile of the first cutting element 102.

The moldboard 109 further comprises a scraper element 303 which is arranged at a specified spacing from the first cutting edge 103, such that adhesion of soil to the first cutting element 102 can be scraped off said first cutting element 102 by means of rotation thereof. For example, a gap may be provided between the scraper element 303 and the first cutting edge 103, which gap is, for example, 0.5 cm to 5 cm at the narrowest point between the first cutting edge 103 and the scraper element.

In FIG. 3, in the upper region of the moldboard 109 the scraper element 303 is a deflector plate or a ledge which is arranged at a specified spacing. In the lower region of the moldboard 109 the scraper element 303 is an edge which is formed by means of a slot between the guide plate 107 and the moldboard 109. The cutting element is guided through the slot in part, such that the adherent earth is scraped off by means of the edge.

Figure 4:
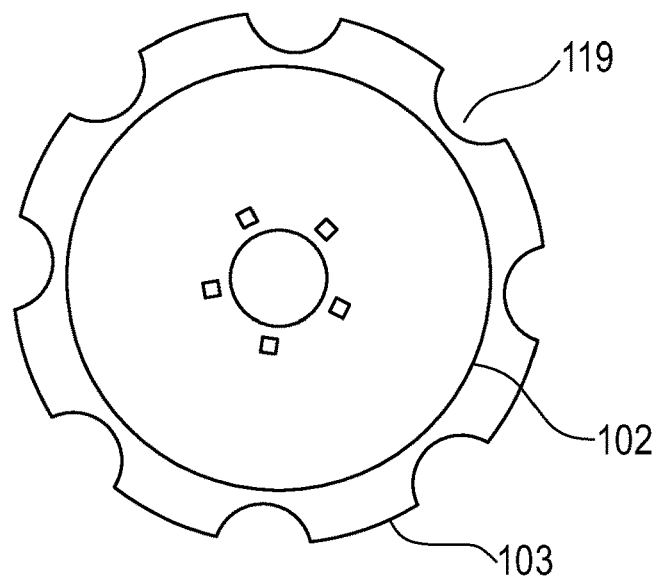
FIG. 4 is a schematic view of a curved cutting element of a further embodiment, given by way of example, of the present invention.

FIG. 4 is a schematic view of a curved cutting element 102. For example, the second cutting element 105 can be designed accordingly. Recesses 119 are made in the first cutting edge 103. As a result, it is possible to achieve an improved cutting action of the cutting element 102 when separating the earth ridge 201.

It should in addition be noted that "comprising" or "having" does not exclude any other elements or steps and that "a" or "one" does not exclude a plurality. It should furthermore be noted that features or steps that have been described with reference to one of the above embodiments can also be used in combination with other features or steps of other embodiments described above. Reference signs in the claims are not to be considered limiting.

Figure 5A:
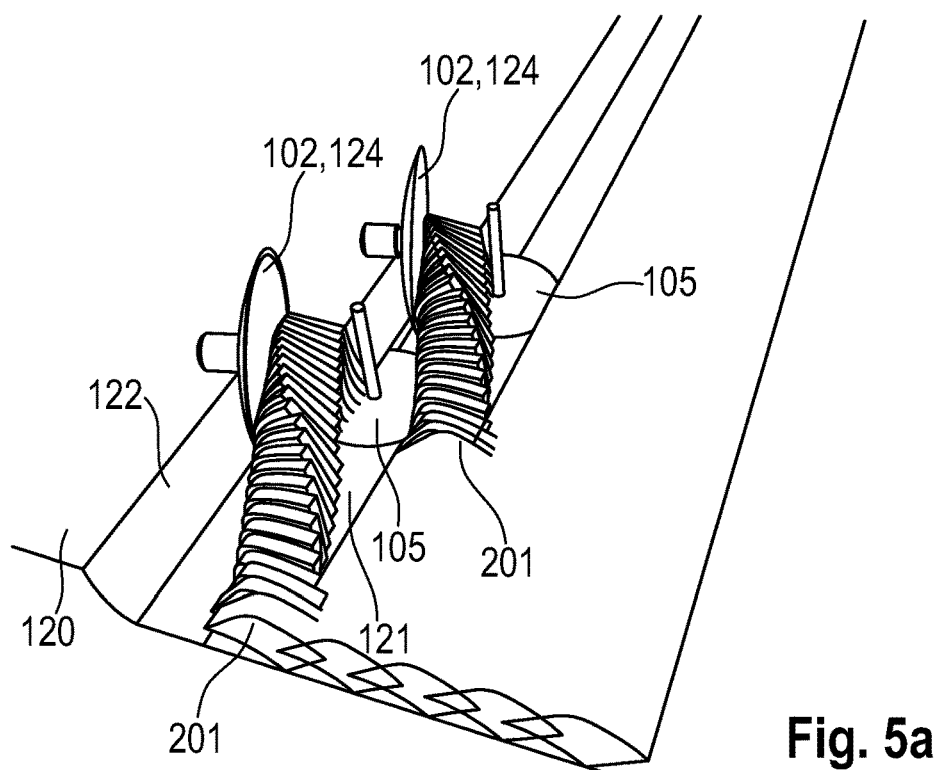
FIG. 5a is a schematic view of a double plow device as a multiple-share plow comprising a first cutting element that spatially follows the second cutting element.
Figure 5B:
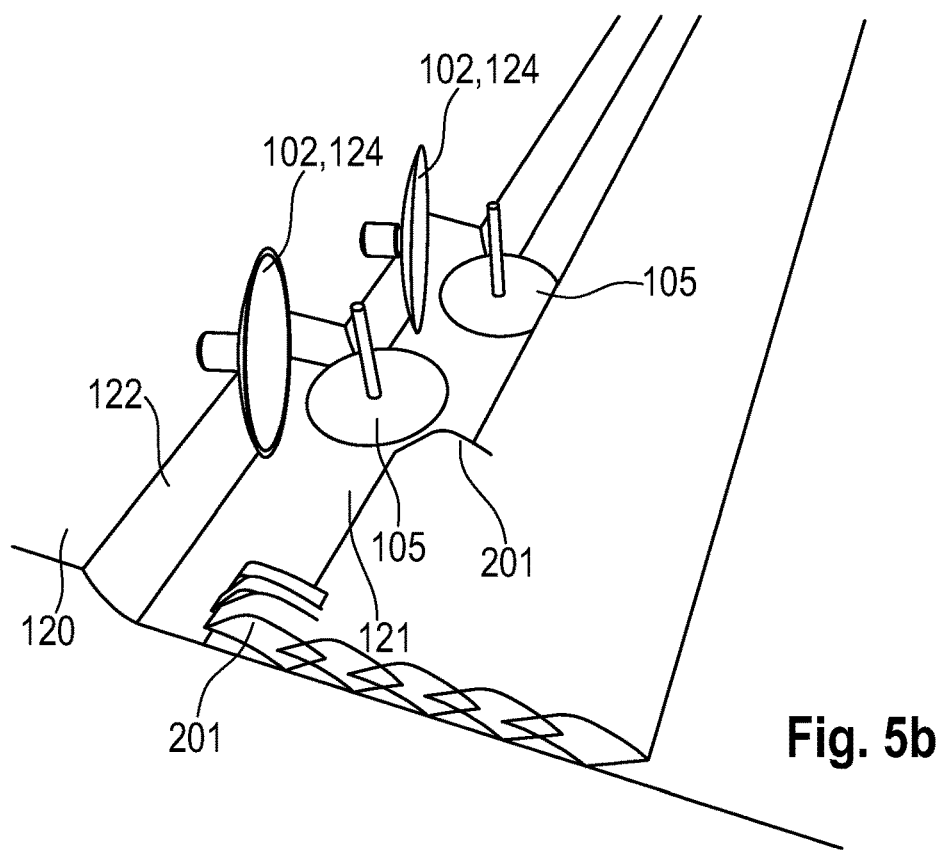

FIGS. 5a and 5b are schematic views of a double arrangement or tandem arrangement of plow devices according to the invention, in which in each case a second cutting element 105 is arranged in front of a first cutting element 102 in the form of an annular plate 124. The front second cutting element 105 is designed in the form of a substantially horizontal discoid cutting means which carves a furrow base 121 in the ground 120. A first cutting element 102 which, in the form of a hollow wheel, cuts a side region 122 of a furrow is arranged spatially after said second cutting element. An earth ridge 201 is separated from the unplowed topsoil by means of the two plate-shaped or discoid cutting elements 102, 105, and, during the forwards movement of the plow, which takes place in the upwards direction in FIGS. 5a and 5b, the earth ridge is pushed through the curvature of the hollow plate 124, such that the earth ridge twists in a helical manner and can be laid in the furrow in a turned manner after emerging from the hollow plate 124.

Figure 6:
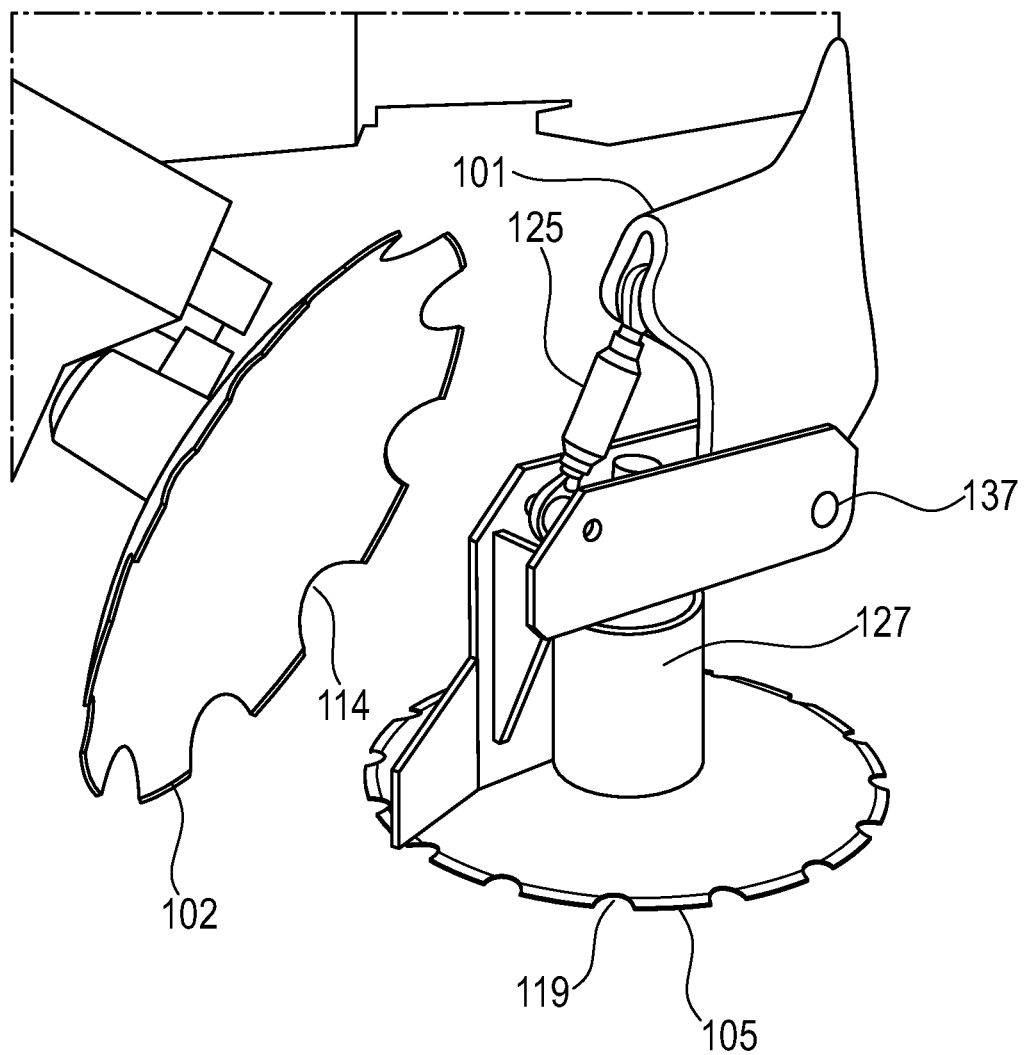
FIG. 6 shows a double-disc plow device comprising a preceding second cutting element and a following first cutting element, in the form of a curved hollow wheel comprising serrated discs in each case.

FIG. 6 shows an embodiment according to the invention comprising two cutting elements which are designed so as to be plate-like or discoid. The first cutting element 102, in front of which, in the plowing direction, the second cutting element 105 is arranged, is arranged on a support structure 101. The first cutting element 102 is designed so as to be plate-like and is in the shape of a spherical cap and comprises a first cutting edge which is provided with recesses 114 such that a toothed first cutting edge 103 is formed. Said first cutting element 102 is fastened to the support structure 101 so as to be slightly inclined and such that the hollow plate shape faces towards the part of the second cutting element 105 that is to the rear in the plowing direction 110. Said first cutting element 102 is used for cutting a lateral cutting surface 113 (not shown) from a base region (not shown), which lateral cutting surface at the same time forms the edge surface of an earth ridge 201 (not shown). The second cutting element 105, which, as a substantially planar disc 106, likewise comprises recesses 119, is arranged so as to precede said first cutting element 102 in the plowing direction 110. This results in a toothed cutting edge 106 for the second cutting element 105. Said toothed cutting edge 106 above all ensures better rotation when pulling the plow device 100 according to the invention through the ground to be plowed, in the event of no driving occurring. The second cutting element 105 is connected to the support structure 101 via a shaft, inside a sleeve or drum 138 and by means of an internal bearing 127. Inclination adjustment 137 of the plane of the second cutting element 105 is possible by means of a swivel pin that is connected to the support structure 101. For this purpose, an angle plate structure is arranged on the support structure 101, on which angle plate structure a transverse bolt carries angle adjustment means 125, the opposing side of which is directly connected to the support 101. The work angle α (not shown here) for the second cutting element 105 can be adjusted by means of adjusting the angle adjustment means 125.

Figure 7:
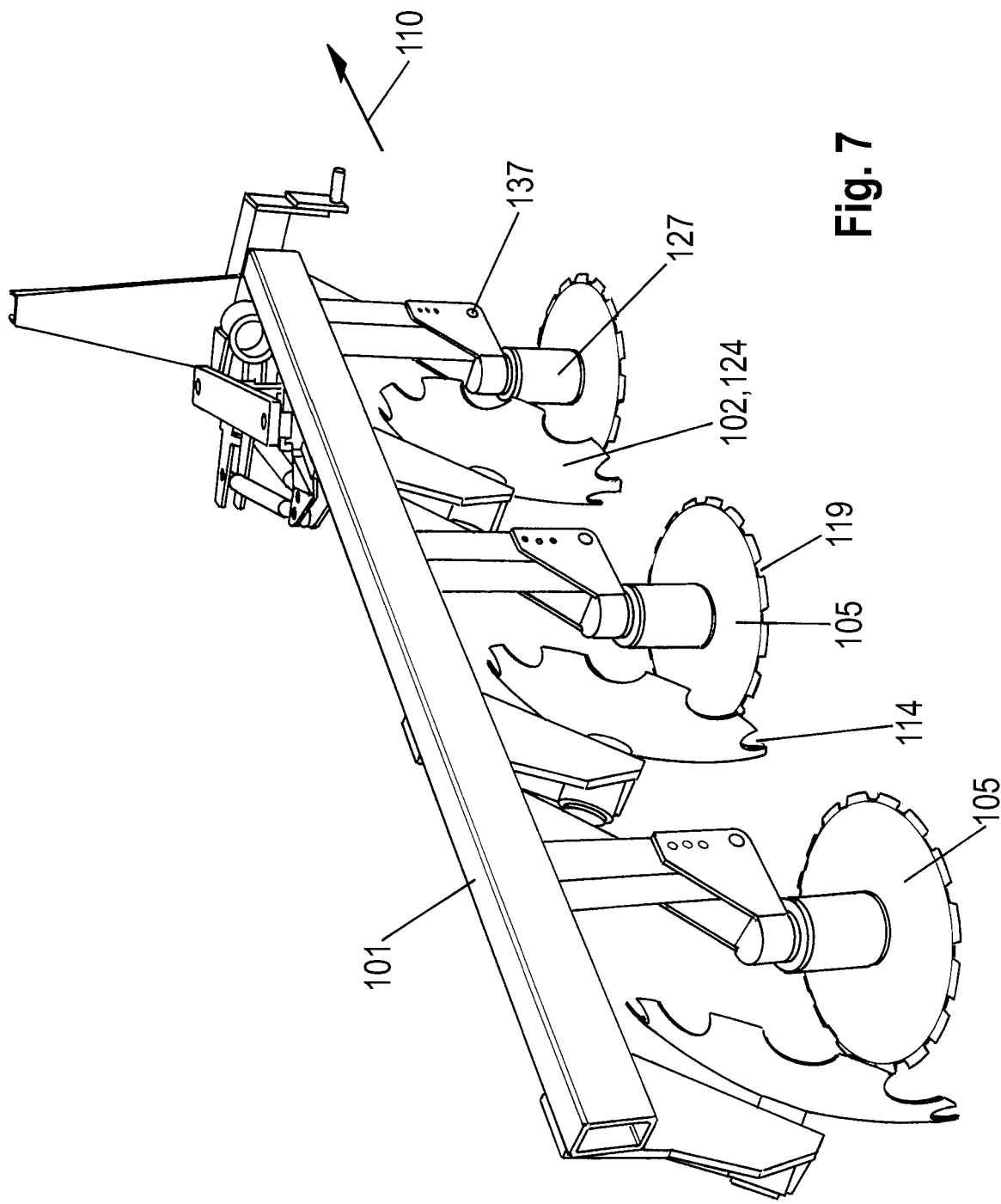
FIG. 7 shows a device according to FIG. 6 arranged in a triple arrangement, obliquely one behind the other, as a conventional plow device in the form of a three-share plow.

FIG. 7 shows the fundamental arrangement of the plow device 100 comprising a first hollow plate-shaped cutting element 102 and a second discoid cutting element 105 according to FIG. 6, but in a triple arrangement one behind the other on the support structure 101. The fundamental components are identical to those of FIG. 6 and are therefore not repeated here.

Figure 8:
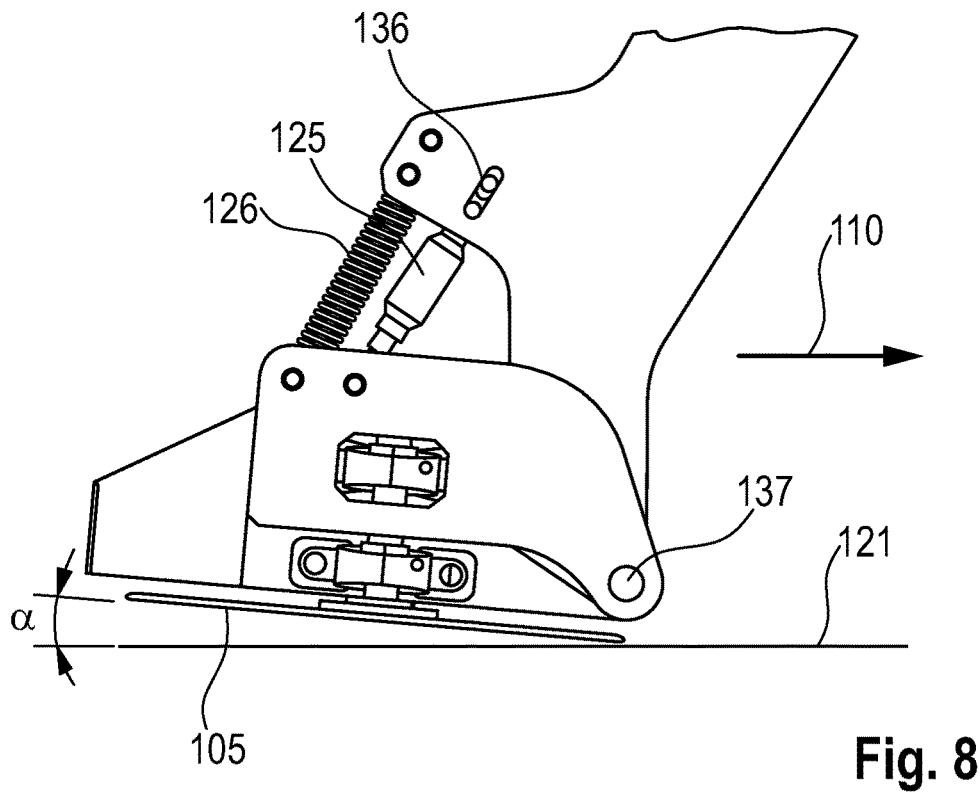
FIG. 8 is a schematic view of the second cutting element having a work angle α that is defined in the plowing direction, and an angle adjustment means.

FIG. 8 illustrates mechanical pull-down depth regulation for the second cutting element 105. The second cutting element 105 is inclined downwards towards the furrow base 121, in the plowing direction 110, at a work angle α relative to the horizontal. Pull-down of the plow is ensured by positioning the otherwise horizontal discoid cutting element 105 about the angle α. The pivot point of an inclination adjustment 137 for the second discoid cutting element 105 is positioned as close as possible to the furrow base 121, in the plowing direction 110, such that the second cutting element 105 is automatically oriented horizontally, under the action of the cut earth ridge (not shown), by means of the earth that is separated, as the earth ridge, during plowing. In this case, the required pull-down force is ensured by a spring 126 which brings about the positioning by means of an adjustable preload force. If the weight of the earth ridge 201 acting on the second cutting element 105 decreases, the spring force brings about a larger work angle and the plow is pulled into the earth. Once the plow has reached the desired working depth, the second cutting element 105 is automatically oriented horizontally, as a result of which the resistance is reduced to a minimum. In addition, the adjustable angle adjustment means 125, for example in the form of an adjustable strut in conjunction with a slot 136, can specify a minimum work angle for the angle adjustment means.

It is also possible, however, for a hydraulic cylinder to be used instead of the spring 126, as a result of which hydraulic depth and pull-down control can be achieved. Hydraulic depth and pull-down control of this kind allows for flexible options for control and regulation of the working depth and the pull-down force. In this case it is also possible to change the position of the pivot point, i.e. the inclination adjustment 137, resulting in additional design freedoms. As a result, it is even possible, in this manner, to achieve an implementation in the form of tractive force regulation.

Figure 9:
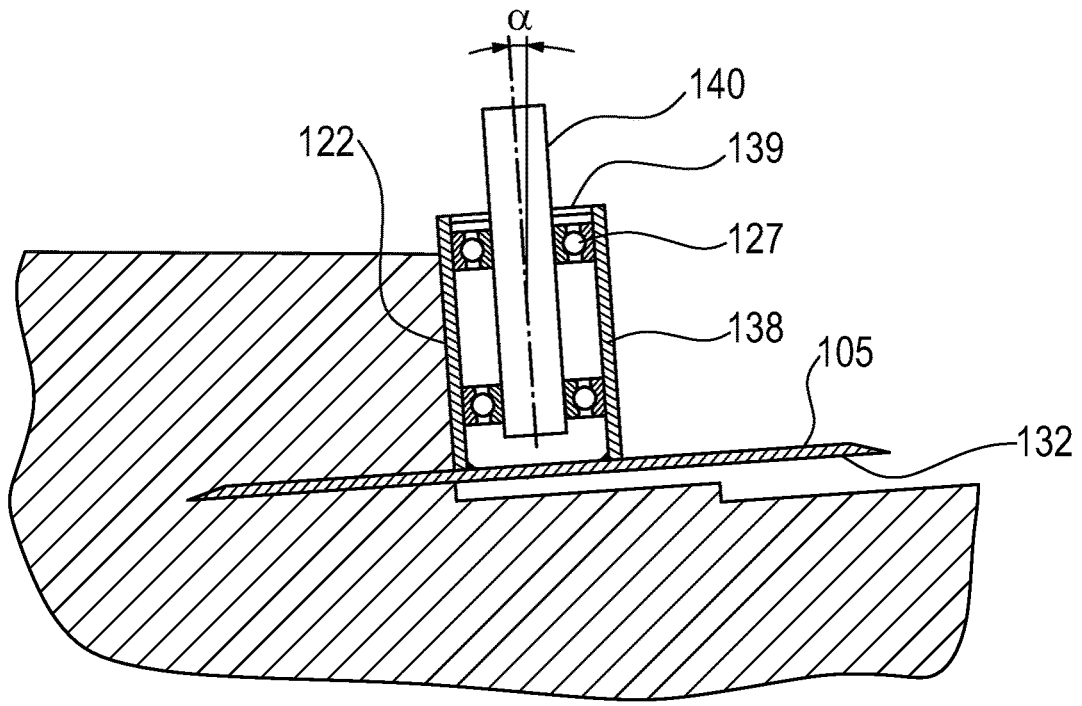
FIG. 9 is a schematic view of the second cutting element comprising an internal bearing.

FIG. 9 shows the second cutting element 105 comprising an internal bearing 127 in a tube, which is also referred to as a drum bearing. According to this embodiment, the rotating bearing of the horizontal discoid second cutting element 105 is accommodated in a tube or in a drum 138. Said tube is rigidly connected to the second cutting element 105. Internal bearings are arranged inside the tube, which bearings are positioned on a stationary bearing shaft 140 for the second cutting element 105. Said bearing shaft 140 is in turn connected to the support structure 101 of the plow. This results in the essential advantage that, in the case of corresponding sealing on the upper face of the tube or the drum 138 by means of a cover 139, the bearings 143 are arranged so as to be entirely protected against earth particles and dust. In addition, the rotating tube or the rotating drum 138 takes on a function of providing support against the furrow wall 122. As a result, the friction forces can be further reduced compared with an embodiment having rigid contact. The axis of rotation of the bearing shaft 140 can advantageously be arranged so as to be inclined by an angle α relative to the perpendicular, in order to ensure that clearances result between the lower face 132 of the second cutting element 105 and the furrow base 121 that is cut by the preceding plow element, which clearances also contribute to minimizing the tractive force.

Figure 10:
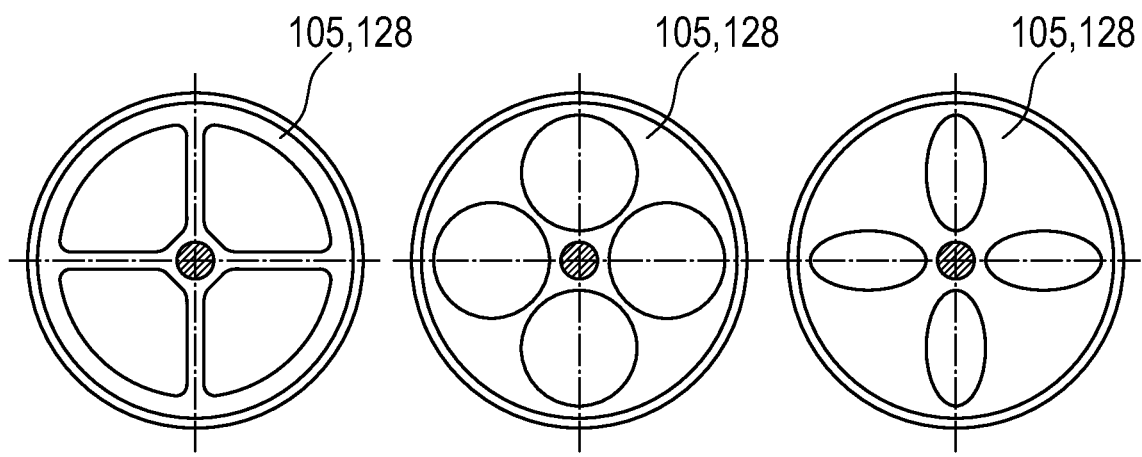
FIG. 10 is a schematic view of the second cutting element in different shapes of spoked wheels in each case.

FIG. 10 shows the second cutting element 105 as a spoked wheel 128. The three different variants of a spoked wheel show different spoke shapes. In principle, however, this is always a wheel that is connected by means of spokes to a hub in the center of the spoked wheel. Owing to the provision of spokes having the corresponding clearances therebetween, the friction forces between the horizontal second cutting element 105 and the earth can be further reduced because the effective contact surface is reduced. In this case, it is irrelevant whether the spokes of the spoked wheel 128 are designed having straight or curved spokes. It is also possible to vary the number of spokes, it being possible for the space between the spokes to be designed in the manner of a circular segment-shaped, circular, or elliptical recess. In a similar manner, such a design of the second cutting element 105 can also be applied to the first cutting element 102, i.e. the annular plate 124.

Figure 11:
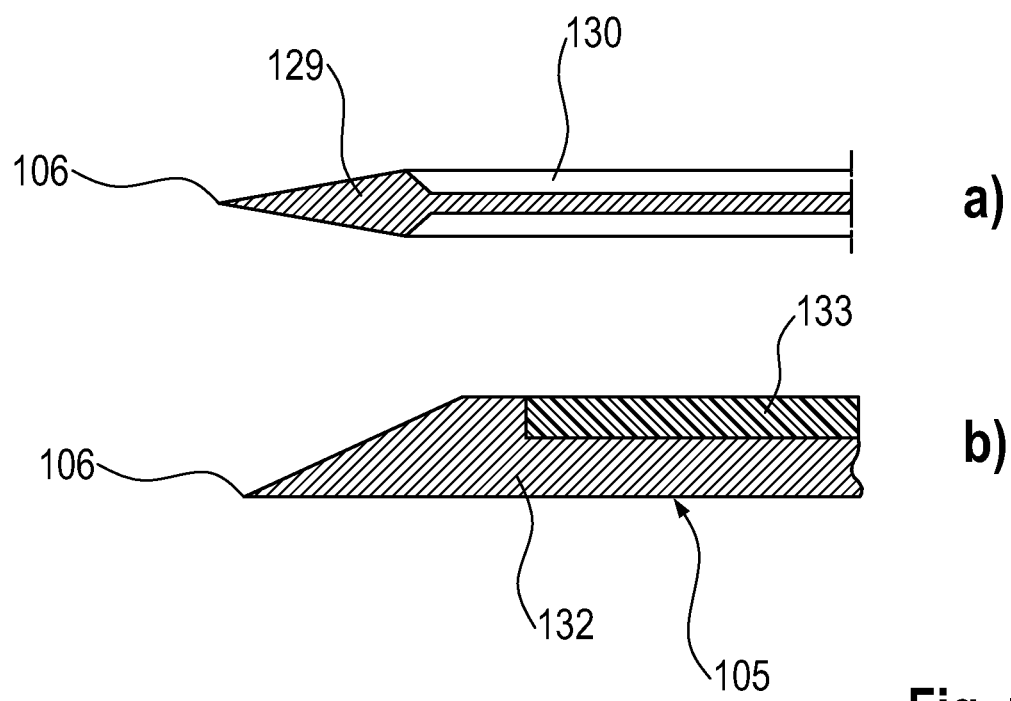
FIG. 11a) is a partial sectional view through a cutting element comprising a tapering cutting edge and undercuts in the central region of the cutting element.
FIG. 11b) shows a cutting element having a composite structure, comprising a tip and a central region consisting of steel, and an upper region consisting of plastics material.

In order to further reduce the resistance when pulling the plow device 100 through the ground to be plowed, it may furthermore be preferable to form the horizontal discoid cutting element 105 according to FIG. 11*a*) such that the cross section of the cutting element 105 tapers immediately after the second cutting edge 106, as a result of which the contact forces of the ground on the cutting element, and the friction forces acting therewith, are reduced.

Said tapering of the cross section may be formed on one side or on both sides, as an undercut 130 behind the preceding cutting tip. In the case of a one-sided design, the undercut 130 is, for example, formed only on the upper face of the second cutting element 105, while it is also possible for an undercut to be provided only on the lower face of the second cutting element. However, an undercut both on the upper face and on the lower face of the second cutting element is preferred (FIG. 11*a*)).

According to FIG. 11*b*), the second cutting element 105 is formed as a composite material. In this case, the cutting tip and the lower central body of the discoid second cutting region 105 consists of steel, whereas the upwardly pointing upper face 133 of the second cutting element 105 consists of wear-resistant and adhesion-reducing plastics material.

An adhesion-reducing coating or an adhesion-reducing layer on the upper face 133 of the second cutting element 105 is important, in the sense of providing a significant advantage, in particular in the case of heavy, claggy and humic ground conditions.

Figure 12:
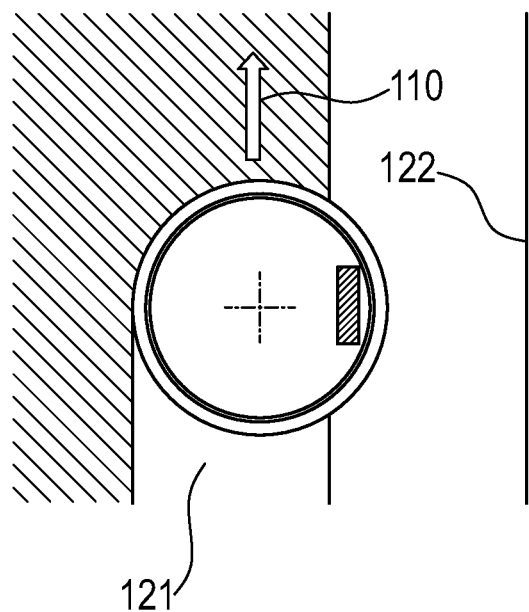
FIG. 12 shows a second cutting element comprising a circumferential cutting edge, the circumferential cutting edge being designed as a cutting ring comprising a stationary central region.
Figure 13:
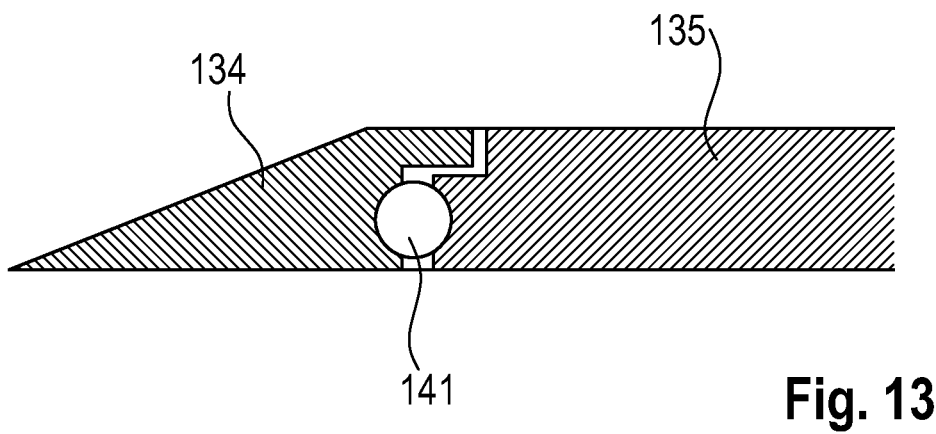
FIG. 13 is a partial sectional view having the bearing drawn in between the cutting ring and the stationary inner wheel.

FIG. 12/FIG. 13 show a second cutting element 105 in the form of a two-part cutting element, in which a stationary central plate, i.e. a stationary wheel 135, is provided, on which a cutting ring 134, forming the tip of the second cutting element 105, is arranged by means of a bearing 141, which cutting ring rotates around the stationary inner wheel 134 by means of the bearing 141. An essential advantage of an embodiment of this kind is also that said second cutting element 105 no longer necessarily has to be fastened to the support structure 101 in the middle, as is the case for a rigid disc. It is thus possible to prevent the part of the second cutting edge 106 that is not engaged from protruding into the already plowed ground region, as necessarily occurs in the case of a centrally mounted disc.

Figure 14:
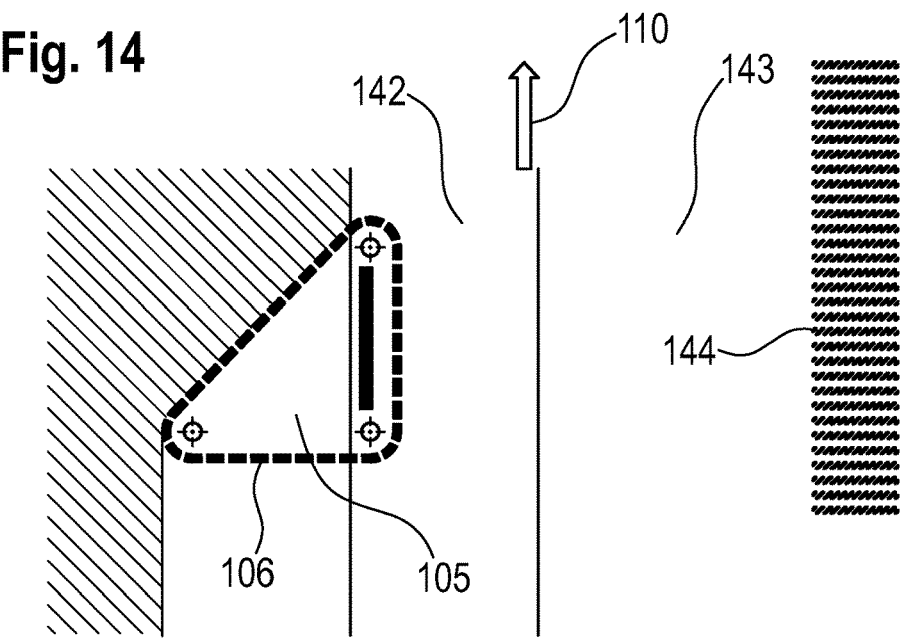
FIG. 14 shows a second cutting element in the form of a circumferential chain.

FIG. 14 shows a horizontal discoid second cutting element 105 in the form of a flexible circumferential cutting edge 106 which is formed in the manner of a chainsaw. This results in the advantage that the mounting and fastening of the second cutting element 105 does not necessarily have to occur in the center, as is the case for the rigid discoid cutting elements. It is thus possible to prevent the cutting edge 106 that is not engaged from protruding into the already plowed ground region, as necessarily occurs in the case of a rigid disc. Of course, the cutting edge 106 can be designed so as to be either passively or actively driven. Passively driven is intended to be understood to mean that the cutting edge moves as a result of friction forces when the plow device 100 is pulled through the ground. "Actively driven" is understood to mean that a drive unit is provided which sets into motion the second cutting element comprising the chain links. It is also possible, however, for no circumferential chain links to be provided, but rather for a cutting element to cut the furrow base in a shape differing from a circle.

Figure 15A:
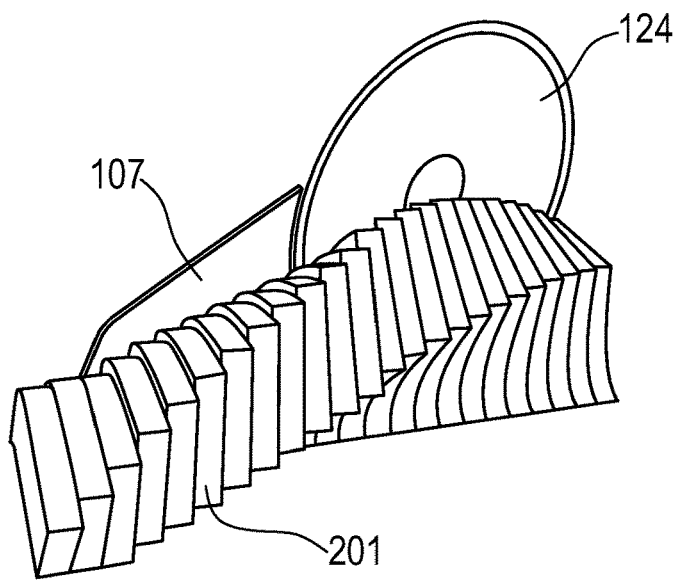
FIG. 15a shows an embodiment comprising a vertical annular plate having an additional guide plate.
Figure 15B:
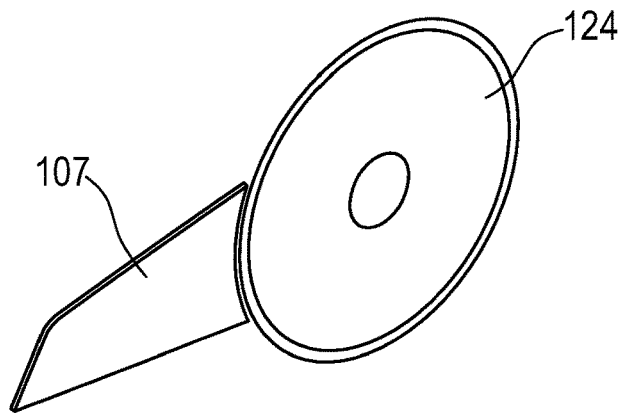

Finally, in FIGS. 15a and 15b, a vertical annular plate 124 is provided, which plate is arranged in a manner comparable to that in the case of a conventional moldboard plow, ensuring complete turning of the earth ridge 201, with the result that it may be necessary, in some circumstances, for an additional guide plate 107 to be provided behind the substantially vertical first cutting element 102 of the annular plate 124. The task of said guide plate 107 is simply that of completing the turning of the earth ridge 201 already initiated by the annular plate 124, barely any forces now acting between the guide plate 107 and the earth ridge 201. In the case of a plow element arranged at the rearmost position on the plow frame, said guide plate 107 may additionally assist the furrow clearing, in order to achieve a furrow that is cleared to a sufficient width for the wheels of the towing vehicle, for the subsequent travel.

Figure 16:
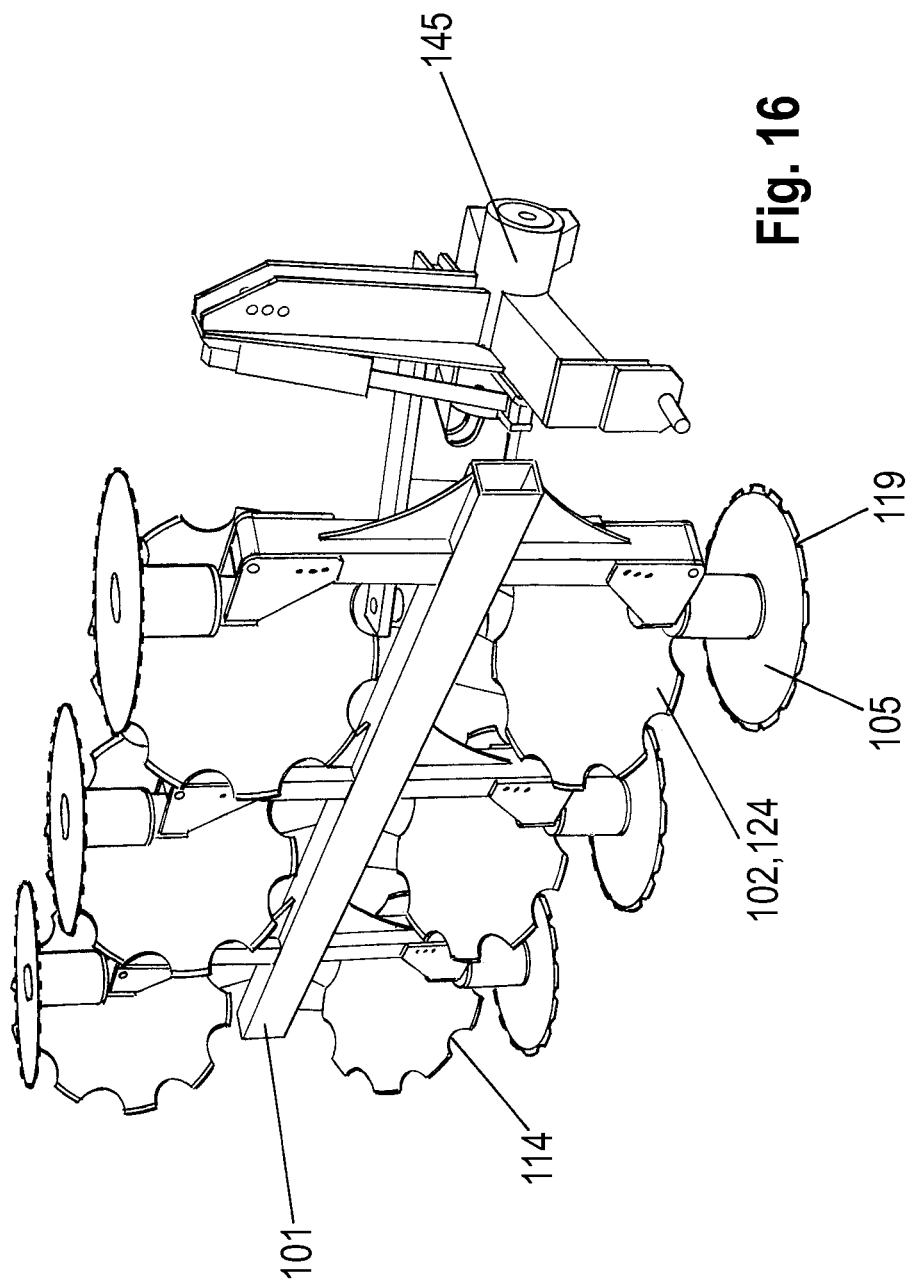
FIG. 16 shows a plow device that is designed as a turning plow or rotating plow, in each case comprising three discoid cutting element pairs according to the invention.

FIG. 16 shows a turning plow comprising three disc pairs in each case (first 102 and second cutting element 105) on each side of the plow device 100, which plow is connected by means of a coupling device 145 to a vehicle pulling the plow. During the turning process, the plow is turned by 180°, such that the opposing disc pairs are used.

FIGS. 17a and 17b show a further embodiment in which the preceding second cutting element 105 for cutting the lower face of the earth ridge 201 and thus for creating the furrow base is designed as a driven second cutting element. The preceding second cutting element 105 has a cutting width which, in the case of the second cutting element 105 being designed as a cutting disc, corresponds to the diameter thereof, which is of such a size as to be suitable for two following first cutting elements 102. The two first cutting elements 102 are arranged obliquely one behind the other and so as to be mutually offset, such that the first first cutting element 102 that directly follows the second cutting element 105 cuts or separates a first earth ridge 201 from the earth to be plowed, and a second earth ridge is cut from the earth to be plowed by means of the second first cutting element 102 which is then offset obliquely behind. That is to say that two adjacent furrow bases are cut simultaneously, as it were, by means of the second cutting element that is relatively wide with respect to the cutting width. In order that the second cutting element 105 can fulfil a dual function of this kind, the shaft thereof, by means of which said second cutting element 105 is actively driven, must be inserted into a separation gap that is cut by a preceding carving colter. In the case of an arrangement of this kind, the second cutting element 105 must be driven, since, in the case of a symmetrical design, no forces are present for causing the disc to rotate, when being guided or pulled through the earth to be plowed, without a drive.

However, owing to the preceding carving colter, precisely the resistance of the shaft when pulling the plow device through the unplowed earth is reduced to a minimum. In addition, according to this embodiment a depth controller is provided which monitors and ensures that the second cutting element cuts the furrow base at the desired depth. For this purpose, a distance controller 147 is provided which is arranged in the region between the first first cutting element 102 and the second first cutting element. The distance sensor 147 delivers a depth signal of the cut furrow to the depth controller 146, such that it is ensured, during plowing, that a desired plowing depth can be maintained.

The invention claimed is:

1. Plow device for plowing ground, the plow device comprising
   a support structure,
   a rotatable first cutting element that is formed as a cutting plate and comprises a circumferential first cutting edge, wherein the first cutting element is arranged on the support structure and the first cutting edge comprises a first cutting region configured to cut a side region of an earth ridge of the ground when the support structure is moved on the ground in a plowing direction,
   a second discoid cutting element comprising a second cutting edge, wherein the second cutting element is arranged on the support structure and the second cutting edge comprises a second cutting region configured to cut a base region of an earth ridge of the ground when the support structure is moved on the ground in a plowing direction, wherein the second cutting region is arranged in front of the first cutting region, in the plowing direction, and the cutting elements can be caused to rotate by the earth ridge during plowing, and
   a moldboard arranged on the support structure so as to be behind the first cutting region of the first cutting element, in the plowing direction, the moldboard comprising a conveying surface, along which the earth ridge can be conveyed after being separated from the ground, the conveying surface being domed, such that the earth ridge can be turned when the earth ridge sweeps along the conveying surface.

2. Plow device according to claim 1, further comprising a guide plate, the guide plate configured to receive a compression force pressing thereon from the earth ridge when cutting the earth ridge to keep the first cutting element at the desired cutting depth thereof.

3. Plow device according to claim 1, wherein the first cutting element and the second cutting element are arranged relative to one another such that the cutting region of the first cutting edge of the first cutting element is spaced apart vertically from the second cutting edge of the second cutting element.

4. Plow device according to claim 1, wherein the first cutting region is formed within a first cutting plane and the second cutting region is formed within a second cutting plane, wherein the first cutting plane and the second cutting plane form an angle relative to one another of from 30° to 135°.

5. Plow device according to claim 1, wherein the first cutting edge of the first cutting element and/or the second cutting edge of the second cutting element is/are provided with respective recesses and is/are thus toothed or serrated.

6. Plow device according to claim 1, wherein the second cutting edge is a cutting edge around the circumference of the second cutting element.

7. Plow device according to claim 1, wherein the first cutting element is in the shape of a cone or in the shape of a truncated cone, and/or the second cutting element is in the shape of a cone or in the shape of a truncated cone.

8. Plow device according to claim 1, wherein the moldboard comprises a receiving region for receiving the first cutting element, wherein the first cutting element is received in the moldboard such that the first cutting region of the first cutting edge protrudes from the moldboard in the plowing direction.

9. Plow device according to claim 1, wherein the support structure is designed such that the first cutting element and/or the second cutting element can be adjusted, relative to the moldboard, in the plowing direction.

10. Plow device according to claim 1, wherein the support structure is designed such that the spacing between the first cutting region of the first cutting edge of the first cutting element, and the second cutting region of the second cutting edge of the second cutting element, can be adjusted.

11. Plow device according to claim 1, in which the first cutting element is formed in the manner of a hollow plate, having a curvature of an inner surface thereof.

12. Plow device according to claim 1, in which the second cutting element comprises an angle adjustment means, with respect to the work angle $\alpha$ thereof, by means of which a positive angle $\alpha$ of attack is adjustable in the plowing direction.

13. Plow device according to claim 12, in which the work angle $\alpha$ can be adjusted mechanically or hydraulically or electrically using the angle adjustment means.

14. Plow device according to claim 12, further comprising a spring ensuring a required pull-down force when moving the second cutting element along the furrow base, the spring having a spring force configured to hold the second cutting element in a substantially horizontal orientation with the weight of the earth ridge thereon.

15. Plow device according to claim 1, in which the second cutting element comprises an internal bearing, arranged in a tube, in the manner of a drum bearing.

16. Plow device according to claim 1, in which the second cutting element comprises a spoked wheel having a spoke region.

17. Plow device according to claim 1, in which the second cutting element consists of a composite material.

18. Plow device according to claim 1, in which the second cutting element is formed in two parts and comprises a rotating cutting ring which is supported with respect to a stationary inner wheel by a bearing.

19. Plow device according to claim 18, in which the cutting ring is actively driven.

20. Plow device according to claim 1, in which the second cutting element is a cutting blade.

21. Plow device according to claim 1, in which the second cutting element is actively driven and has as cutting width configured to cut the base region of the earth ridge for at least two following first cutting elements.

22. Plow device according to claim 16, wherein the spoked wheel comprises a tapering cutting edge having an undercut in the spoke region.

23. Plow device according to claim 17, in which a lower face of the second cutting element that faces the furrow base and the cutting edge of the second cutting element consist of steel, and the upper face of the second cutting element that faces the earth ridge consists of a wear-resistant and adhesion-reducing plastics material.

24. Plow device according to claim 1, wherein the first cutting region is formed within a first cutting plane and the second cutting region is formed within a second cutting plane, wherein the first cutting plane and the second cutting plane form an angle relative to one another of from 45° to 110°.

* * * * *